(12) United States Patent
Kontani et al.

(10) Patent No.: US 12,194,852 B2
(45) Date of Patent: Jan. 14, 2025

(54) DISPLAY DEVICE AND INPUT DEVICE

(71) Applicant: Panasonic Intellectual Property Management Co., Ltd., Osaka (JP)

(72) Inventors: Masaki Kontani, Osaka (JP); Takeshi Masutani, Kanagawa (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 90 days.

(21) Appl. No.: 18/300,090

(22) Filed: Apr. 13, 2023

(65) Prior Publication Data

US 2023/0347740 A1    Nov. 2, 2023

(30) Foreign Application Priority Data

Apr. 28, 2022  (JP) ................................ 2022-074482
Oct. 25, 2022  (JP) ................................ 2022-170883

(51) Int. Cl.
| | |
|---|---|
| *H04N 7/18* | (2006.01) |
| *B60K 35/00* | (2006.01) |
| *B60K 35/10* | (2024.01) |
| *B60K 35/22* | (2024.01) |
| *B60K 35/25* | (2024.01) |

(52) U.S. Cl.
CPC .............. *B60K 35/00* (2013.01); *B60K 35/10* (2024.01); *B60K 35/22* (2024.01); *B60K 35/25* (2024.01); *B60K 2360/115* (2024.01); *B60K 2360/143* (2024.01); *B60K 2360/33* (2024.01); *B60K 2360/693* (2024.01); *B60Y 2400/92* (2013.01); *B60Y 2410/12* (2013.01)

(58) Field of Classification Search
CPC ...................................................... B60K 35/00

USPC ......................................................... 348/837
See application file for complete search history.

(56) References Cited

U.S. PATENT DOCUMENTS

| | | | | |
|---|---|---|---|---|
| 2011/0210834 A1* | 9/2011 | Pasquero | ............ | G06F 3/04883 340/407.1 |
| 2011/0210926 A1* | 9/2011 | Pasquero | ................ | G06F 3/016 715/702 |
| 2011/0304558 A1* | 12/2011 | Pasquero | ................ | G06F 3/016 345/173 |
| 2012/0162143 A1* | 6/2012 | Kai | ...................... | H04M 1/0266 345/177 |
| 2019/0081274 A1* | 3/2019 | Choi | ..................... | H10K 59/873 |
| 2020/0004364 A1* | 1/2020 | Jung | .................... | H04M 1/0266 |

(Continued)

FOREIGN PATENT DOCUMENTS

JP         2020024832 A      2/2020

*Primary Examiner* — Leron Beck
(74) *Attorney, Agent, or Firm* — Seed IP Law Group LLP

(57) ABSTRACT

A display device includes: an outer cover with light transmission properties; a design sheet with light transmission properties provided on the outer cover; a cushion layer with light transmission properties provided on a back surface side of the outer cover; and a light source provided on a back surface side of the cushion layer. When viewed in a cross section, the cushion layer includes: a plurality of first concave portions that are in a convex shape in a first orientation and a concave shape on a side opposite to the convex shape; and a plurality of second concave portions that are connected to the first concave portions and are in a convex shape in a second orientation and a concave shape on a side opposite to the convex shape. The first concave portions and the second concave portions are alternately provided.

25 Claims, 13 Drawing Sheets

(56) References Cited

U.S. PATENT DOCUMENTS

2020/0042043 A1\* 2/2020 Lee .................. G06F 1/1626
2021/0365072 A1\* 11/2021 Kinoshita ............ G06F 1/1616
2023/0288956 A1\* 9/2023 Kishimoto ........... G06F 1/1616
2023/0297132 A1\* 9/2023 Kishimoto ........... G06F 1/1652

\* cited by examiner

FIG. 3
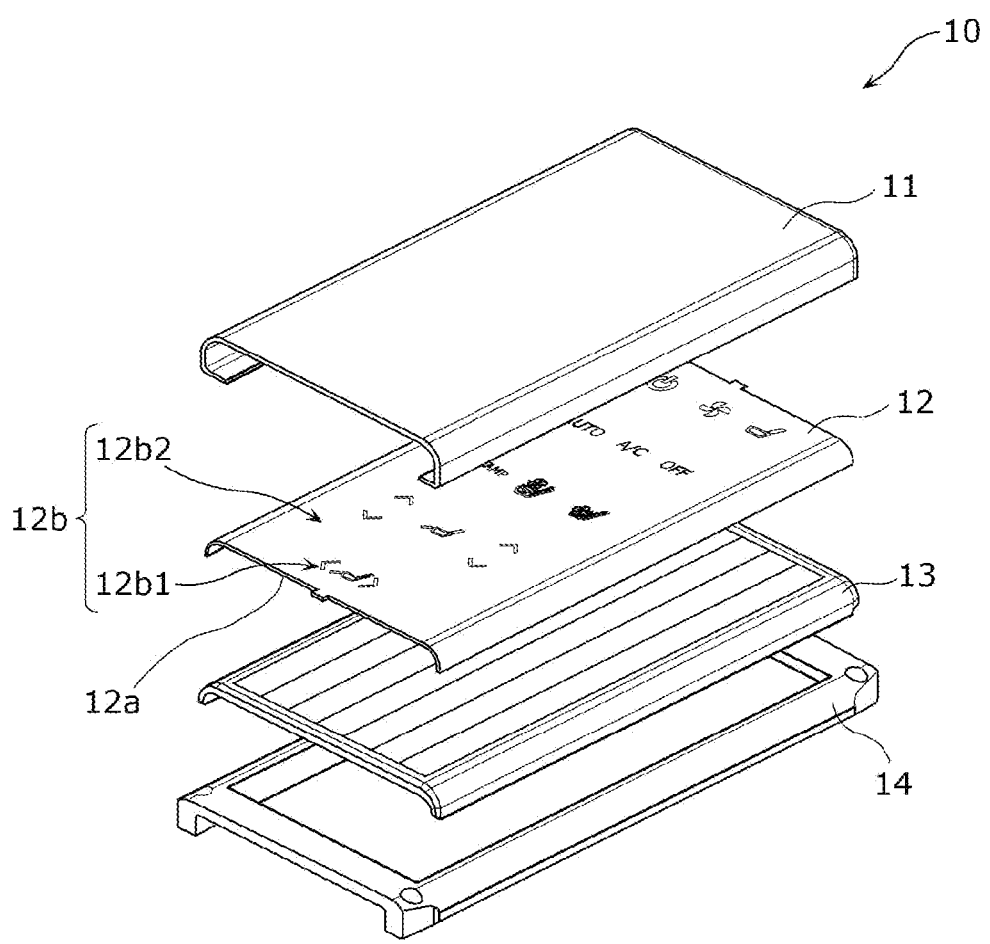
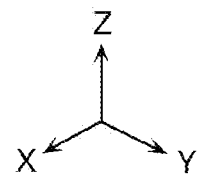

DISPLAY DEVICE AND INPUT DEVICE

CROSS REFERENCE TO RELATED APPLICATIONS

The present application is based on and claims priority of Japanese Patent Application No. 2022-074482 filed on Apr. 28, 2022, and Japanese Patent Application No. 2022-170883 filed on Oct. 25, 2022.

FIELD

The present disclosure relates to a display device and an input device.

BACKGROUND

Conventionally, a vehicle such as an automobile is equipped with a display device that presents a desired display, an input device that receives an input operation from a user such as the driver of the vehicle, and the like. For example, Patent Literature (PTL) 1 discloses a switch device (input device) that can cause a user to feel a soft tactile sensation when the user operates the switch device.

CITATION LIST

Patent Literature

PTL 1: Japanese Unexamined Patent Application Publication No. 2020-24832

SUMMARY

However, the input device according to PTL 1 can be improved upon.

Accordingly, the present disclosure provides a display device and an input device capable of improving upon the above related art.

A display device according to one aspect of the present disclosure includes: an outer cover that has light transmission properties; a design portion that has light transmission properties and is provided on a front surface side or a back surface side relative to the outer cover; a cushion layer that has light transmission properties and is provided on the back surface side relative to the outer cover; and a light source provided on a back surface side relative to the cushion layer, wherein, when the display device is viewed in a cross section taken along a plane parallel to a stack direction in which the outer cover and the design portion are stacked, the cushion layer includes a plurality of concave portions that are in a convex shape in the stack direction and a concave shape on a side opposite to the convex shape, the plurality of concave portions include first concave portions and second concave portions, the first concave portions are in a convex shape in a first orientation in the stack direction relative to a reference line that is parallel to a first direction that intersects the stack direction and a concave shape on a side opposite to the convex shape in the first orientation, the second concave portions are connected to the first concave portions and are in a convex shape in a second orientation that is opposite to the first orientation in the stack direction relative to the reference line and a concave shape on a side opposite to the convex shape in the second orientation, and the first concave portions and the second concave portions are alternately provided in the first direction. An input device according to one aspect of the present disclosure includes: the display device described above; and a detector that is provided on the back surface side relative to the cushion layer and detects an operation from a user.

According to the one aspect of the present disclosure, it is possible to achieve a display device and the like capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

FIG. 3 is an exploded perspective view of an outer cover member according to the embodiment.

Figure 1:
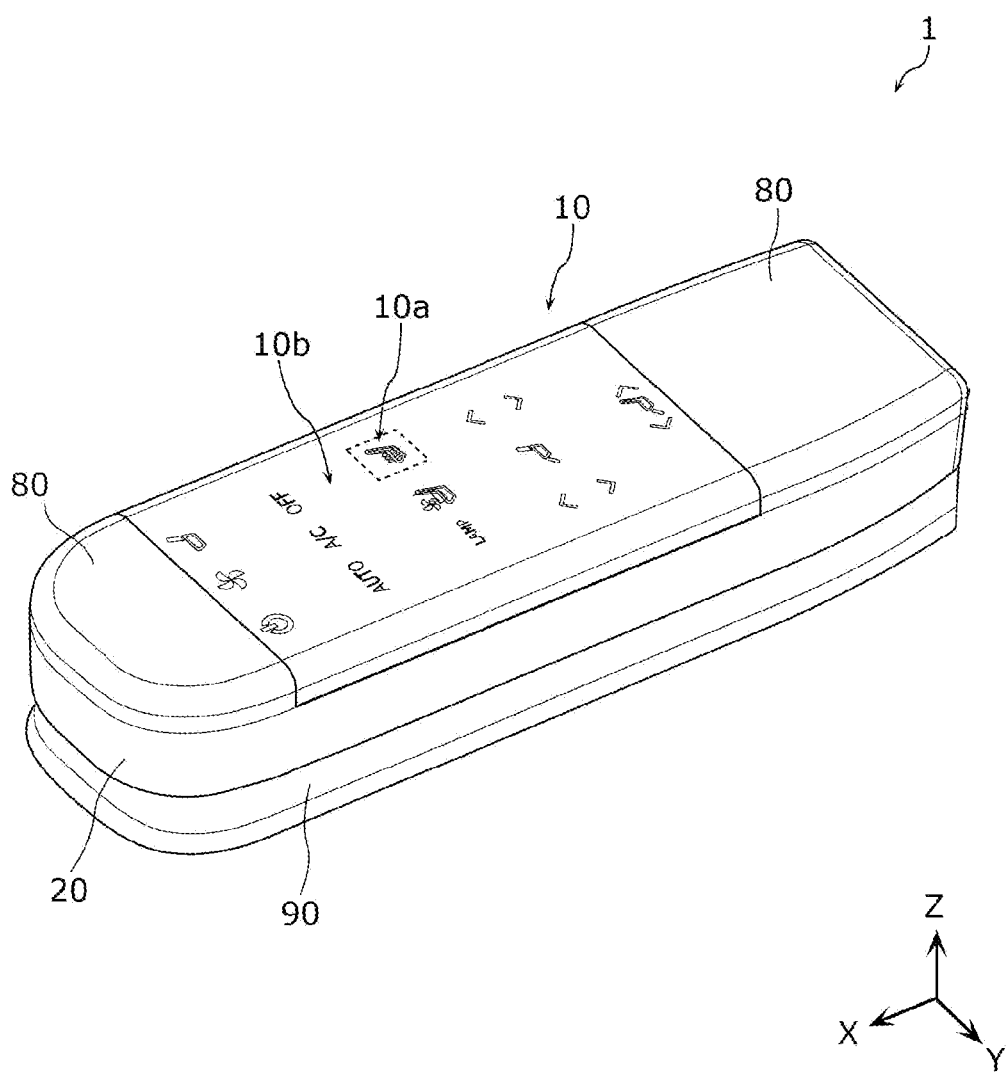
FIG. 1 is a perspective view showing an example of an external configuration of an input device according to an embodiment.

DESCRIPTION OF EMBODIMENTS (Underlying Knowledge Forming Basis of the Present Disclosure)

As described in the background section above, the input device disclosed in PTL 1 can be improved upon. For example, a display device and an input device are often required to not cause a user to feel uncomfortable with a tactile sensation perceived by the user when touching the device. The input device disclosed in PTL 1 can be improved upon in terms of not causing a user to feel uncomfortable with the tactile sensation. Accordingly, the inventors of the present application conducted in-depth studies to make further improvement for a display device and an input device that can cause a user to feel less uncomfortable with the tactile sensation, and arrived at a display device and an input device described below.

A display device according to one aspect of the present disclosure includes: an outer cover that has light transmission properties; a design portion that has light transmission properties and is provided on a front surface side or a back surface side relative to the outer cover; a cushion layer that has light transmission properties and is provided on the back surface side relative to the outer cover; and a light source provided on a back surface side relative to the cushion layer, wherein, when the display device is viewed in a cross section taken along a plane parallel to a stack direction in which the outer cover and the design portion are stacked, the cushion layer includes a plurality of concave portions that are in a convex shape in the stack direction and a concave shape on a side opposite to the convex shape, the plurality of concave portions include first concave portions and second concave portions, the first concave portions are in a convex shape in a first orientation in the stack direction relative to a reference line that is parallel to a first direction that intersects the stack direction and a concave shape on a side opposite to the convex shape in the first orientation, the second concave portions are connected to the first concave portions and are in a convex shape in a second orientation that is opposite to the first orientation in the stack direction relative to the reference line and a concave shape on a side opposite to the convex shape in the second orientation, and the first concave portions and the second concave portions are alternately provided in the first direction.

With this configuration, the cushion layer has a convex-concave shape in the stack direction. Accordingly, the cushion layer is easily compression-deformed when the outer cover is pressed, and it is therefore possible to give a soft tactile sensation to the user. Also, as a result of a plurality of first concave portions and a plurality of second concave portions being formed, the user can perceive the same tactile sensation between when pressing a portion corresponding to a first concave portion and when pressing a portion corresponding to a second concave portion. That is, it is possible to achieve a display device that can cause a user to feel less uncomfortable with the tactile sensation.

Also, for example, the first concave portions and the second concave portions that are alternately provided may form a corrugated shape when the display device is viewed in the cross section taken along the plane parallel to the stack direction.

With this configuration, the cushion layer with a corrugated shape is used. Accordingly, it is possible to suppress the occurrence of brightness variations (design element variations) in the light that has passed through the cushion layer caused by the shape of the cushion layer. Accordingly, it is possible to achieve a display device that can cause a user to feel less uncomfortable with the tactile sensation while suppressing the occurrence of brightness variations.

Also, for example, the cushion layer may include a first corrugated member in which the plurality of first concave portions and the plurality of second concave portions that are alternately provided in the first direction extend in a second direction that intersects the first direction when the display device is viewed in a plan view.

With this configuration, by using a corrugated tabular member as the cushion layer, it is possible to achieve a display device that can cause a user to feel less uncomfortable with the tactile sensation.

Also, for example, the cushion layer may further include a second corrugated member that is provided to overlap the first corrugated member and in which first concave portions and second concave portions that are configured in an identical manner as the first concave portions and the second concave portions of the first corrugated member are alternately provided in the second direction, and the plurality of first concave portions and the plurality of second concave portions that are alternately provided in the second direction extend in a third direction that intersects the second direction when the display device is viewed in the plan view.

With this configuration, it is possible to achieve a display device that can cause a user to feel less uncomfortable with the tactile sensation.

Also, for example, the first direction and the second direction may be orthogonal to each other when the display device is viewed in the plan view, the second direction and the third direction may be orthogonal to each other when the display device is viewed in the plan view, and the first direction and the third direction may be identical directions.

With this configuration, it is possible to achieve a display device that can cause a user to feel less uncomfortable with the tactile sensation.

Also, for example, where a pitch between adjacent ones of the plurality of first concave portions or adjacent ones of the plurality of second concave portions of the first corrugated member is represented by p1, a length in the stack direction between a ridge of each of the plurality of first concave portions and a ridge of each of the plurality of second concave portions of the first corrugated member may be less than p1, and where a pitch between adjacent ones of the plurality of first concave portions or adjacent ones of the plurality of second concave portions of the second corrugated member is represented by p2, a length in the stack direction between a ridge of each of the plurality of first concave portions and a ridge of each of the plurality of second concave portions of the second corrugated member may be less than p2.

With this configuration, the cushion layer can be easily molded because each corrugated member has a small height. That is, it is possible to achieve a display device with improved productivity.

Also, for example, the cushion layer may include the plurality of first concave portions and the plurality of second concave portions that are two-dimensionally arranged when the display device is viewed in a plan view.

With this configuration, it is possible to achieve a display device that can cause a user to feel even less uncomfortable with the tactile sensation.

Also, for example, when the display device is viewed in a cross section taken along a plane parallel to the stack direction, the cushion layer may further include the first concave portions and the second concave portions that are alternately provided in a second direction that intersects the first direction when the display device is viewed in the plan view, in addition to the first concave portions and the second concave portions that are alternately provided in the first direction, the first concave portions and the second concave portions that are alternately provided in the second direction may be positioned differently in the stack direction relative to the reference line from the first concave portions and the second concave portions that are alternately provided in the first direction, and the first concave portions provided in the first direction and the second concave portions provided in the second direction may be connected to each other.

With this configuration, it is possible to achieve a display device that can cause a user to feel even less uncomfortable with the tactile sensation.

Also, for example, the second orientation may be an orientation extending from the cushion layer toward the outer cover, and the plurality of second concave portions each may have a ridge with a flat surface.

With this configuration, the difference in tactile sensation perceived between when a second concave portion is pressed and when a portion between adjacent second concave portions is pressed can be reduced. Accordingly, it is possible to achieve a display device that can cause a user to feel even less uncomfortable with the tactile sensation.

Also, for example, when the display device is viewed in a plan view, the cushion layer may include a first portion on which a design element formed in the design portion is superimposed and a second portion surrounding the first portion, and the first portion may have a light transmission rate higher than a light transmission rate of the second portion.

With this configuration, the design element is brightly displayed. Accordingly, it is possible to achieve a display device with an improved appearance of the design element.

Also, for example, the first portion may be transparent or colored with a light transmission color, and the second portion may have light blocking properties.

With this configuration, it is possible to achieve a display device that can display the design element with a desired color.

Also, for example, a sheet that has light blocking properties may be provided between each adjacent pair of the plurality of first concave portions.

With this configuration, it is possible to suppress a situation in which light that has entered one of adjacent first concave portions leaks from the other first concave portion. Accordingly, it is possible to achieve a display device with an improved appearance of the design element.

Also, for example, the design portion may be provided to be superimposed on two or more of the plurality of first concave portions and two or more of the plurality of second concave portions when the display device is viewed from the stack direction.

With this configuration, the display device can give the same tactile sensation to a user no matter which of the first concave portions and the second concave portions is pressed by the user. Accordingly, it is possible to achieve a display device that can cause a user to feel even less uncomfortable with the tactile sensation.

Also, for example, the cushion layer may be formed by using a silicone rubber that has light transmission properties.

With this configuration, the cushion layer can be easily produced by molding a silicone rubber or the like.

Also, for example, the cushion layer may contain light diffusing particles that have a refractive index different from a refractive index of the silicone rubber. Also, for example, the design portion may contain a silicone rubber that has light transmission properties and light diffusing particles that have a refractive index different from a refractive index of the silicone rubber.

With this configuration, brightness variations caused by the cushion layer can be suppressed. Accordingly, it is possible to achieve a display device with an improved appearance of design elements.

Also, for example, the design portion may include a print layer on which design elements are provided.

With this configuration, the design portion can be produced by using a simple method such as printing.

Also, for example, the design portion may include a design sheet in which design elements are provided.

With this configuration, in the case where it is necessary to change the design elements according to the vehicle model or the like, the design elements can be changed by simply replacing the design sheet to a different one, without changing the outer cover. Also, cushioning properties can be imparted by providing the design sheet. Accordingly, it is possible to achieve a display device that can cause a user to feel even less uncomfortable with the tactile sensation and in which the design elements can be easily changed according to the vehicle model or the like.

Also, for example, the plurality of first concave portions or the plurality of second concave portions may be quadrilateral, hexagonal, or circular in shape when the display device is viewed in a plan view.

With this configuration, by using the first concave portions or the second concave portions that are in a simple shape such as a quadrilateral shape, a hexagonal shape, or a circular shape, it is possible to achieve a display device that can give a soft tactile sensation to the user.

Also, an input device according to one aspect of the present disclosure includes: the display device described above; and a detector that is provided on the back surface side relative to the cushion layer and detects an operation from a user.

With this configuration, the same advantageous effects as those of the display device described above can be obtained.

Also, for example, the cushion layer may be compression-deformed in response to the outer cover being pressed.

With this configuration, the cushion layer is compression-deformed in response to the outer cover being pressed. Accordingly, it is possible to achieve an input device that can give a soft tactile sensation to the user when operating the outer cover.

Also, for example, the detector may detect the operation from the user when the outer cover is further pressed while the cushion layer is compression-deformed.

With this configuration, the operation from the user can be detected when the cushion layer is compression-deformed. Accordingly, it is possible to achieve an input device that can give a soft tactile sensation to a user before an operation from the user is detected. Also, in the case where the input device includes a vibration device that provides a stimulus to the haptic sensation of a user while the user is operating the outer cover, it is possible to achieve an input device that can suppress a situation in which vibrations generated by the vibration device are absorbed by the cushion layer.

Also, for example, the detector may include, on a surface of the cushion layer opposite to a surface of the cushion layer on which the outer cover is provided, a sensor film that has light transmission properties and detects an operation position, and the input device may further include: a tabular frame that is provided between the sensor film and the light source and includes through holes at positions corresponding to design elements formed in the design portion; and a protective layer that has light transmission properties and is provided between the sensor film and the tabular frame.

With this configuration, the stress concentratedly applied to the detector when a press operation is performed is reduced by the protective layer. Accordingly, it is possible to achieve a highly reliable input device.

Also, for example, the protective layer may contain light diffusing particles.

With this configuration, the light diffused in advance reaches the cushion layer, and thus brightness variations caused by the cushion layer can be suppressed. Accordingly, it is possible to achieve an input device with a further improved appearance of design elements.

Also, for example, the input device may further include a vibration device that transmits vibrations to the cushion layer, and the vibration device may vibrate in at least a plane direction of the cushion layer.

With this configuration, even when vibrations generated by the vibration device are absorbed in the thickness direction of the cushion layer due to the cushion layer being compression-deformed by a press operation, the vibrations of the vibration device in the plane (horizontal) direction of the cushion layer are transmitted, and thus the vibrations absorbed by the cushion layer can be suppressed. That is, it is possible to achieve an input device that can more reliably transmit the vibrations of the vibration device to the user's finger.

An embodiment described below shows a generic or specific example of the present disclosure. The numerical values, shapes, materials, structural elements, the arrangement and connection of the structural elements, and the like shown in the following embodiment are merely examples, and therefore are not intended to limit the scope of the present disclosure. Also, among the structural elements described in the following embodiment, structural elements not recited in any one of the independent claims are described as arbitrary structural elements. In addition, the diagrams are schematic representations, and thus are not necessarily true to scale. Also, in the diagrams, structural elements that are the same are given the same reference numerals.

Also, in the specification of the present application, the terms that describe the relationship between elements such as "same" and "parallel", the terms that describe the shape of elements such as "rectangular shape" and "circular shape", and numerical values are expressions that not only have a strict meaning but also encompass a substantially equal range, for example, a margin of about several percent (or about 10%).

Also, in the diagrams used in the following description of the embodiment, coordinate axes are shown as appropriate. The Z axis indicates a stack direction in which the structural elements of the input device are stacked. Also, the X axis direction and the Y axis direction are directions that are orthogonal to each other on a plane perpendicular to the Z axis direction. Also, in the following embodiment and the like, the expression "when viewed in a plan view" means that the input device is seen from the Z axis direction, and the expression "when viewed in a cross section" means that the input device is seen from a cross section taken along a plane parallel to the stack direction (the Z axis direction).

Also, in the specification of the present application, unless otherwise stated, ordinal numbers such as "first" and "second" are not intended to mean the number or order of structural elements, but are used to prevent the same types of structural elements from being mixed up and distinguish the same types of structural elements from each other.

Embodiment

[1. Overall Configuration of Input Device]

Figure 2:
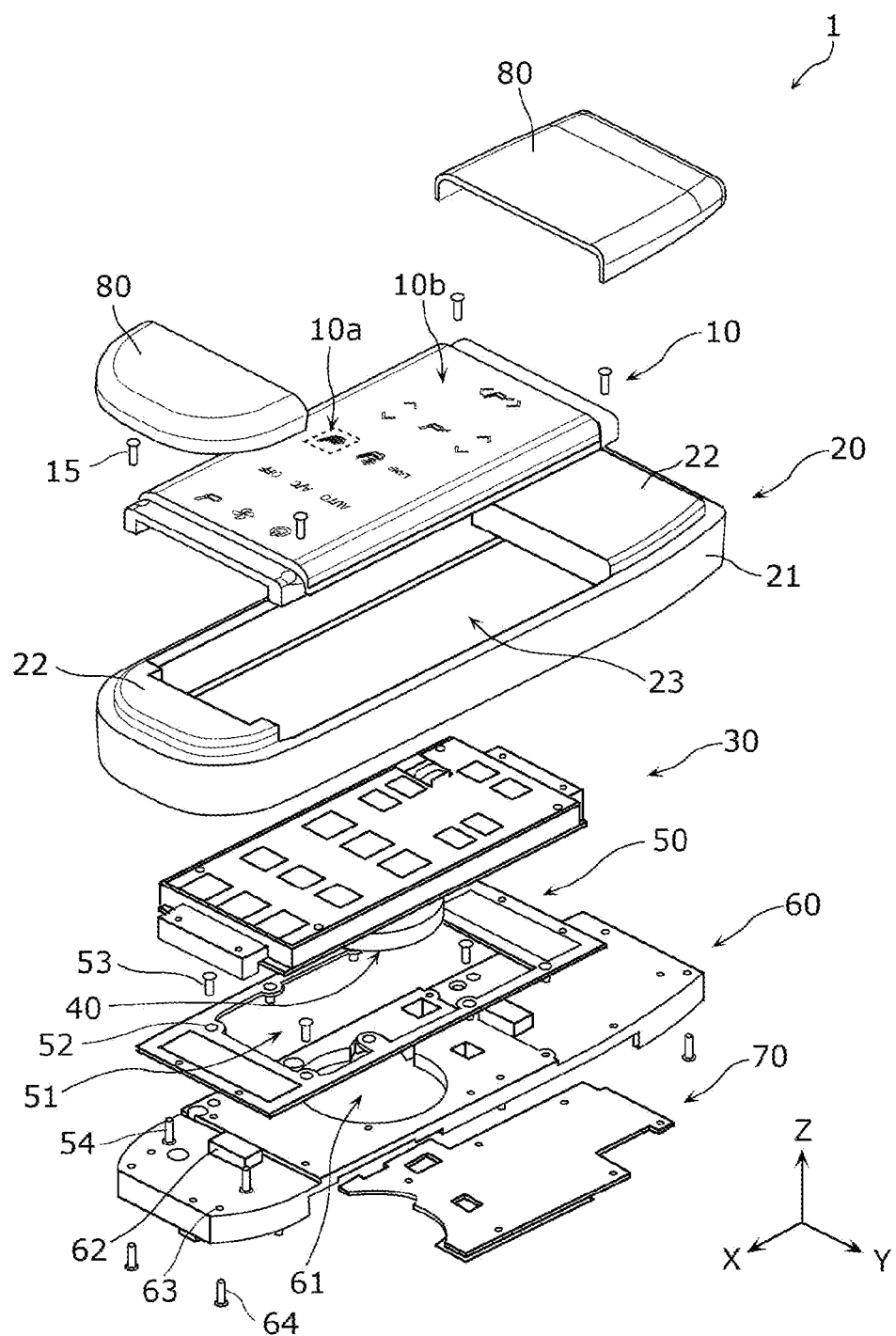
FIG. 2 is an exploded perspective view of the input device according to the embodiment.

First, an overall configuration of input device 1 according to the present embodiment will be described with reference to FIGS. 1 and 2. FIG. 1 is a perspective view showing an example of an external configuration of input device 1 according to the present embodiment. FIG. 2 is an exploded perspective view of input device 1 according to the present embodiment.

As shown in FIG. 1, input device 1 is a device for receiving operations input to control devices included in an object (for example, a vehicle such as an automobile) equipped with input device 1. Specifically, input device 1 receives a push operation (hereinafter also referred to simply as "operation") performed on the surface of outer cover member 10 from a user.

In the case where the object is a vehicle, the devices included in the object are onboard devices such as, for example, a car navigation system, an audio device for playing an optical disk, a video playing device, and an air conditioner. However, the devices are not limited thereto.

The object equipped with input device 1 is not limited a vehicle. It is sufficient that input device 1 is included in an object that receives user operations, and input device 1 may be included in, for example, a household appliance or the like.

As shown in FIGS. 1 and 2, input device 1 includes outer cover member 10, main body 20, frame member 30, vibration device 40, plate spring 50, chassis 60, main substrate 70, a pair of upper covers 80, and lower cover 90.

Outer cover member 10 is a user interface on which predetermined design elements are displayed and that receives an operation from a user. The user can control the devices included in the vehicle by operating outer cover member 10. Outer cover member 10 is, for example, a tabular member, and is pressed in response to the operation from the user.

The predetermined design elements are, for example, design elements for controlling various types of devices included in the vehicle equipped with input device 1. FIG. 1 shows an example in which a plurality of design elements are displayed on outer cover member 10. However, there may be only one design element. Also, outer cover member 10 includes first regions 10a in which design elements are displayed and second region 10b in which no design element is displayed.

Each first region 10a is a switch portion that functions as a switch in input device 1. That is, the switch portion of input device 1 is a portion in which a design element is displayed. The user can control a device by operating first region 10a that corresponds to the device the user wants to control. In FIG. 1, as an example, one first region 10a is indicated by a dotted frame. However, the shape of first region 10a is not limited thereto.

Second region 10b is a non-switch portion that does not function as a switch in input device 1. Even when the user operates second region 10b, none of the devices of the vehicle is controlled. Second region 10b includes a region surrounding each first region 10a (a region surrounding a design element) and a region between adjacent first regions 10a (a region between design elements). It can also be said that second region 10b is a region that is not operated by the user for the purpose of controlling the devices of the vehicle.

Input device 1 may be installed in a place where the user can unconsciously touch input device 1 such as an armrest or a console. That is, outer cover member 10 can be touched by the user even when the user does not need to operate any of the devices. For example, outer cover member 10 can be touched by the user even when the user places his/her arm on the armrest or the like.

When the user touches outer cover member 10 without the intention to control any of the devices of the vehicle, the user may touch not only first region 10a but also second region 10b. For example, second region 10b may be touched by the user at the same time when first region 10a is touched. At this time, if the user perceives different tactile sensations (hand touch sensations) between first region 10a and second region 10b, the user may feel uncomfortable with the tactile sensations. To address this, outer cover member 10 according to the present embodiment is configured such that the same tactile sensation can be perceived between when first region 10a is touched and when second region 10b is touched. A configuration of outer cover member 10 will be described later.

Outer cover member 10 is fixed to main body 20 by using, for example, fastening members such as screws 15.

Main body 20 is a frame-shaped member that holds outer cover member 10 and houses frame member 30, vibration device 40, plate spring 50, chassis 60, and main substrate 70. In the present embodiment, main body 20 holds frame member 30 (for example, frame 32) so as to be movable (capable of moving) in a direction (the Z axis direction) in which outer cover member 10 (for example, outer cover 11) and frame member 30 (for example, frame 32 shown in FIG. 4) are stacked when outer cover member 10 is operated. Main body 20 includes frame portion 21 and a pair of restriction portions 22.

Frame portion 21 is a frame-shaped member that has a size and a thickness (a length in the Z axis direction) sufficient to house frame member 30, vibration device 40, plate spring 50, chassis 60, and main substrate 70.

The pair of restriction portions 22 are respectively provided at opposing end portions on one side of opening 23 of frame portion 21 (in the present embodiment, on the plus side of the Z axis). Opening 23 is formed in a region between the pair of restriction portions 22. Opening 23 is a region surrounded by frame portion 21 and the pair of restriction portions 22 when viewed in a plan view. Also, opening 23 may have, for example, the same size as outer cover 11 of outer cover member 10 when viewed in a plan view. Opening 23 is an opening for outer cover member 10 to be placed.

Main body 20 holds outer cover member 10 by sandwiching opposing ends of outer cover member 10 in the X axis direction by the pair of restriction portions 22 and the pair of upper covers 80. Opening 23 is closed by, for example, outer cover member 10.

Main body 20 is formed by using a resin, a metal, or the like. However, the material of main body 20 is not limited thereto. Also, for example, frame portion 21 and the pair of restriction portions 22 are integrally formed, but the configuration is not limited thereto.

Frame member 30 is held by main body 20 so as to be movable in the direction (the Z axis direction) in which outer cover member 10 and frame member 30 are stacked when outer cover member 10 is operated by the user, and moves in the Z axis direction in response to outer cover member 10 being operated by the user. Frame member 30 is held by main body 20 so as to move in the minus direction of the Z axis irrespective of whether first region 10a or second region 10b is operated. For example, frame member 30 moves in the minus direction of the Z axis relative to vibration device 40, chassis 60, and a push detector (see push detector 100 shown in FIG. 5), which will be described later, as a result of plate spring 50 that supports frame member 30 being pressed. Frame member 30 has, for example, a plate shape, and is held by main body 20 to be parallel to outer cover member 10.

Frame member 30 is provided between outer cover member 10 and plate spring 50, and is forced toward the plus side of the Z axis by plate spring 50. Also, the movement of frame member 30 in the plus direction of the Z axis is restricted as a result of opposing ends of frame member 30 in the X axis direction abutting against the pair of restriction portions 22 of main body 20. The initial position of frame member 30 in the Z axis direction is determined by the pair of restriction portions 22 and plate spring 50. As used herein, the term "initial position" refers to the position of outer cover member 10 in the Z axis direction when outer cover member 10 is not operated by the user. A configuration of frame member 30 will be described later.

Vibration device 40 is an example of a haptic sensation provider that provides a stimulus to the haptic sensation of the user while the user is operating outer cover member 10. Vibration device provides a haptic sensation to the user operating outer cover member 10 by using, for example, vibrations. Vibration device 40 is mechanically connected to frame member 30 (for example, frame 32), and provides a haptic sensation to the user operating outer cover member 10 via frame member 30 and outer cover member 10 by using vibrations. As used herein, the expression "mechanically connected" means that vibrations generated by vibration device 40 are transmitted to frame member 30, and frame member 30 can vibrate in response to receiving the vibrations of vibration device 40. In the present embodiment, vibration device 40 is fixed directly to frame member 30.

Vibration device 40 includes a vibrator that generates vibrations. The vibrator may be, for example, a piezoelectric element that includes a piezoelectric body, or may be a mechanism that electromagnetically operates such as a motor, a solenoid, or a loudspeaker voice coil. Alternatively, the vibrator may be a linear resonant actuator, an artificial muscle, a shape memory actuator, or the like.

Vibration device 40 is provided on the opposite side of outer cover member 10 relative to frame member 30 (on the minus side of the Z axis of frame member 30) at a position to overlap frame member 30 when viewed in a plan view. Vibration device 40 is provided, for example, between frame member 30 and chassis 60. Vibration device 40 is provided, for example, in a center portion of frame member 30 when viewed in a plan view.

The haptic sensation provided to the user is not limited to vibrations, and may be any other sensation or a haptic sensation such as a friction sensation, or a haptic sensation in the sensory nerves such as a current stimulation. As an element that provides a haptic sensation in the sensory nerves, an element that generates an electrostatic friction sensation or the like may be used. Also, the haptic sensation that is provided to the user may be, for example, a haptic sensation that is provided contactlessly. As an element that contactlessly provides a haptic sensation, an element that generates ultrasonic waves or an air flow, or the like may be used.

Plate spring 50 is an elastic body that is provided on the opposite side of outer cover member 10 (on the minus side of the Z axis) relative to frame member 30, and abuts against frame member to push up frame member 30 toward outer cover member 10 (toward the plus side of the Z axis). Also, plate spring 50 bends in response to outer cover member 10 being operated, and enables frame member 30 to move in the minus direction of the Z axis. Plate spring 50 has, for example, such an elastic force that the vibrations of frame member 30 caused by vibration device 40 are not interrupted. However, the elastic force is not limited thereto.

Plate spring 50 is, for example, a frame-shaped member, and may abut against the peripheral edge of frame member 30. Also, opening 51 is formed in plate spring 50 for vibration device 40 to be placed.

Screw holes 52 are formed in plate spring 50. Plate spring 50 is fixed to chassis 60 by using, for example, fastening members such as screws 53. Furthermore, plate spring 50 is fixed to frame member 30 by using, for example, fastening members such as screws 54.

Chassis 60 is a tabular member to which plate spring 50 is fixed. Opening 61 is formed in chassis 60 for vibration device 40 to be placed. Also, in chassis 60, protruding projection portions 62 are provided on both sides of opening 61. Also, screw holes 63 are formed in chassis 60. Chassis 60 is fixed to main body 20 by using, for example, fastening members such as screws 64.

Main substrate 70 is a substrate on which various types of electronic components and the like are mounted. For example, a control circuit for implementing a controller (for example, controller 110 shown in FIG. 8) for controlling the structural elements of input device 1 and the like are mounted on main substrate 70. Main substrate 70 is provided, for example, on the opposite side of outer cover member 10 (on the minus side of the Z axis) relative to chassis 60. Main substrate 70 is a tabular member, but is not limited thereto.

The pair of upper covers 80 is a member that covers the opposing ends of outer cover member 10 in the X axis direction when viewed in a plan view. The pair of upper covers 80 is, for example, a tabular member. When outer cover member 10 and the pair of upper covers 80 are attached to main body 20, the pair of upper covers 80 is flush with the surface of outer cover member 10. The shape of the pair of upper covers 80 is determined as appropriate according to the shape of the pair of restriction portions 22 when viewed in a plan view. The pair of upper covers 80 is formed by using, for example, a rubber, but may be formed by using a resin material.

Lower cover 90 is a cover for closing the other opening of frame portion 21 of main body 20 (in the present embodiment, an opening on the minus side of the Z axis). Lower cover 90 is formed by using a resin, a metal, or the like. However, the material of lower cover 90 is not limited thereto. Lower cover 90 may be formed by using the same material as that of main body 20. In FIG. 2, the illustration of lower cover 90 is omitted.

In input device 1 configured as described above, frame member 30 moves in the minus direction of the Z axis in response to an operation performed on outer cover member 10 by the user. In input device 1, push detector 100 that is provided on a surface of frame member 30 on the minus side of the Z axis detects the user operation performed on outer cover member 10 by detecting the movement of frame member 30. Accordingly, push detector 100 is a part of a detector that detects an operation from a user. Also, vibration device 40 is mechanically connected to frame member 30 (for example, frame 32), and when push detector 100 detects the movement of frame member 30, vibration device 40 vibrates to provide the vibrations to the user via frame member 30 and outer cover member 10. As used herein, the expression "to detect the movement of frame member 30" means to detect that outer cover member 10 has been operated.

Vibration device 40 and the pair of upper covers 80 are not essential structural elements. Also, as will be described later, in input device 1, a tact switch is used as push detector 100, and thus only the tact switch may be provided without providing vibration device 40. The tact switch includes, for example, a metal dome. The metal dome is a disc spring made of stainless steel or the like, and can provide a haptic sensation to the user. That is, with the metal dome, the tact switch can provide a sense of operation to the user. The tact switch is an example of push detector 100. Also, in the present embodiment, a configuration will be described in which a tact switch is used as push detector 100 and vibration device 40 is provided. With this configuration, a haptic sensation that cannot be expressed by a metal dome can be provided to the user. Also, in the case where a tact switch that does not include a metal dome is used, by providing vibration device 40, a haptic sensation can be provided to the user.

Input device 1 does not necessarily need to include push detector 100. Input device 1 without push detector 100 does not have the function (switch function) of detecting a user operation, and functions as a display device that presents a desired display (for example, displays an alert or the like).

[2. Configuration of Outer Cover Member]

Next, the configuration of outer cover member 10 will be further described with reference to FIG. 3. FIG. 3 is an exploded perspective view of outer cover member 10 according to the present embodiment.

As shown in FIG. 3, outer cover member 10 includes outer cover 11, a design portion, cushion layer 13, and frame body 14. The design portion includes design sheet 12. In the present embodiment, outer cover 11, design sheet 12, and cushion layer 13 are stacked in this order. That is, outer cover member 10 has a configuration in which design sheet 12 is provided between outer cover 11 and cushion layer 13. Also, outer cover 11, design sheet 12, and cushion layer 13 constitute a decorated layer.

Outer cover 11 is a portion that constitutes the surface of input device 1 and is touched directly by the user. In the present embodiment, outer cover 11 has light transmission properties such that the user can visually recognize the design elements. As viewed in a plan view, outer cover 11 covers both portions of design sheet 12 in which design elements are provided (for example, light transmission portions 12b1) and a portion of design sheet 12 in which no design element is formed (for example, light blocking portion 12b2) from the surface of sheet member 12a (from the surface of sheet member 12a that is on the plus side of the Z axis). For example, outer cover 11 covers entire design sheet 12 when viewed in a plan view. In outer cover 11, for example, the portions that cover light transmission portions 12b1 and the portion that cover light blocking portion 12b2 are integrally formed. Also, a portion of outer cover 11 that can be touched by the user has, for example, a plate shape. Also, outer cover 11 is configured to entirely cover a plurality of first concave portions 13a and a plurality of second concave portions 13b (see FIG. 5), which will be described later. In the specification of the present application, the expression "to have light transmission properties" means having a light transmission rate relatively higher than that of a portion that has light blocking properties, which will be described later, and it may mean, for example, having a light transmission rate of 10% or more, 30% or more, or 50% or more.

Outer cover 11 is formed by using, for example, a material that can reproduce a tactile sensation that corresponds to the tactile sensation perceived by the user when touching a portion in which input device 1 is provided. Outer cover 11 may be formed by using, for example, a material that corresponds to the material of the portion in which input device 1 is provided (for example, the material of an interior member). In the case where input device 1 is embedded in a portion that is made of a leather material (for example, genuine leather), outer cover 11 may be formed by using, for example, artificial leather that has light transmission properties or the like. Outer cover 11 may be formed by, for example, impregnating a non-woven fabric with urethane resin, or using a urethane-based thermoplastic elastomer.

Design sheet 12 is a layer that constitutes the design portion and is provided between outer cover 11 and frame member 30, more specifically, between outer cover 11 and cushion layer 13, and in which predetermined design elements are provided. In the present embodiment, design sheet 12 includes sheet member 12a and design layer 12b that is formed on sheet member 12a.

Sheet member 12a is a base member on which design layer 12b is formed, and may be, for example, a tabular member that has light transmission properties. Sheet member 12a is formed by using a material that has light transmission properties. The material of sheet member 12a may be the same material as that of cushion layer 13, or may be different from that of cushion layer 13. Also, sheet member 12a may be formed by using a material that is more flexible than outer cover 11 and has good printability. Alternatively, sheet member 12a may be formed by using a material that has a repulsion force smaller than that of outer cover 11. Sheet member 12a may contain a rubber that has light transmission properties. In the present embodiment, sheet member 12a is a silicone rubber sheet made of a transparent silicone rubber. When a silicone rubber sheet is used as sheet member 12a, design layer 12b can be easily formed on sheet member 12a through printing. From the viewpoint of suppressing a reduction in the printability, sheet member 12a may be poreless. In the specification of the present application, the term "to be transparent" means having light transmission properties and having no color. Also, the term "to be transparent" may mean, for example, having a light transmission rate of 50% or more, or 70% or more.

From the viewpoint of causing sheet member 12a to easily bend locally when outer cover member 10 is operated, sheet member 12a may be thin (i.e., the length of sheet member 12a in the Z axis direction, or in other words, the thickness of sheet member 12a may be small). Sheet member 12a may be thinner than outer cover 11. The thickness of sheet member 12a may be, for example, preferably 2.0 mm or less, more preferably 1.0 mm or less, and even more preferably 0.5 mm or less. In the case where input device 1 is provided in a portion that is made of genuine leather, with thin sheet member 12a, input device 1 can give, to the user, a tactile sensation close to the tactile sensation as if pressing genuine leather when the user operates outer cover member 10. Also, with thin sheet member 12a, input device 1 can suppress a situation in which the elastic force of sheet member 12a is exerted. The thickness of sheet member 12a is not limited to the above-described range, and may be determined as appropriate according to the material or the like.

Sheet member 12a is formed by integrally forming, for example, portions in which light transmission portions 12b1 are formed and a portion in which light blocking portion 12b2 is formed.

Design layer 12b includes a print layer on which design elements are provided, the print layer being formed on sheet member 12a through printing. Design layer 12b is formed on the surface of sheet member 12a, but may be formed on the back surface of sheet member 12a (the surface of sheet member 12a that is on the minus side of the Z axis).

Design layer 12b includes: light transmission portions 12b1 that allow light emitted from light source 33 (see light source 33 shown in FIG. 4) included in frame member 30 to pass therethrough; and light blocking portion 12b2 that blocks the light emitted from light source 33. In design layer 12b, design elements are displayed by the light that has passed through light transmission portions 12b1. In FIG. 3, for the sake of ease of understanding, light transmission portions 12b1 are shown in black, and light blocking portion 12b2 is shown in white. However, actually, light transmission portions 12b1 are transparent, and light blocking portion 12b2 is colored in black excluding light transmission portions 12b1.

Each light transmission portion 12b1 forms first region 10a, and light blocking portion 12b2 forms second region 10b. It can also be said that, for example, first region 10a is a light transmission region in which a design element is formed, the light transmission region being formed on sheet member 12a through printing, and second region 10b is a light blocking region formed on sheet member 12a through printing. The light transmission region may be, for example, a region in which a print material for forming the light blocking region is not printed. Each light transmission portion 12b1 is an example of a first portion, and light blocking portion 12b2 is an example of a second portion.

The configuration of design layer 12b is not limited to the configuration described above. For example, design layer 12b may be formed by printing (painting) the entire surface of sheet member 12a in black and removing the black paint in portions corresponding to light transmission portions 12b1 through laser cutting. Accordingly, in the present embodiment, the term "printing" encompasses not only printing the light blocking region on sheet member 12a, but also painting the entire surface of sheet member 12a in black.

Design sheet 12 covers first concave portions 13a and second concave portions 13b. For example, design sheet 12 entirely covers a plurality of first concave portions 13a and a plurality of second concave portions 13b. For example, each of the design elements formed in design sheet 12 is provided to be superimposed on two or more first concave portions 13a and two or more second concave portions 13b when viewed in a plan view.

The surface of design sheet 12 that is on the minus side of the Z axis (or in other words, the surface of design sheet 12 that is brought into contact with second concave portions 13b of cushion layer 13) may be covered with a coating for improving slidability on cushion layer 13. As used herein, the expression "to improve slidability" means to make design sheet 12 and cushion layer 13 unlikely to slide. The coating may be, for example, a fluorine coating, but is not limited thereto.

From the viewpoint of suppressing a situation in which design sheet 12 bites into first concave portions 13a of cushion layer 13, design sheet 12 (for example, a silicone rubber) may have such a hardness that design sheet 12 does not bite into first concave portions 13a of cushion layer 13. For example, design sheet 12 is harder than cushion layer 13. The silicone rubber may have a hardness of, for example, 40 degrees or more.

Cushion layer 13 is a layer with cushioning properties that is provided to give a soft tactile sensation to the user when operating outer cover member 10. Cushion layer 13 is provided on the back surface of design sheet 12 that is opposite to outer cover 11 (on the minus side of the Z axis).

Cushion layer 13 covers both the portions of design sheet 12 in which design elements are provided (for example, light transmission portions 12b1) and a portion of design sheet 12 in which no design element is formed (for example, light blocking portion 12b2) from the back surface of sheet member 12a when viewed in a plan view. Also, cushion layer 13 has light transmission properties to guide light to light transmission portions 12b1. Cushion layer 13 covers, for example, entire design sheet 12 when viewed in a plan view. Cushion layer 13 has, for example, a plate shape. Cushion layer 13 is formed by integrally forming, for example, portions that cover light transmission portions 12b1 and a portion that covers light blocking portion 12b2.

Cushion layer 13 has cushioning properties higher than those of sheet member 12a. Details will be described with reference to FIG. 5. Cushion layer 13 according to the present embodiment has a shape that is compression-deformable in response to outer cover 11 being pressed. Cushion layer 13 is formed by using a material (for example, a silicone rubber) that has light transmission properties. In the present embodiment, cushion layer 13 is made of a transparent silicone rubber. With this configuration, by molding the silicone rubber, cushion layer 13 can be produced easily by using an ordinary material. Also, because cushion layer 13 is transparent, light emitted from light source 33 can be transmitted without the color of the light being changed. Cushion layer 13 may be formed by using a urethane-based thermoplastic elastomer, a urethane rubber, or the like.

Even when cushion layer 13 is made of a silicone rubber, cushion layer 13 is formed in a compression-deformable shape, and thus cushion layer 13 easily collapses (the thickness of cushion layer 13 is partially reduced) in response to outer cover 11 being pressed. Accordingly, cushion layer 13 enables the user to easily feel a soft tactile sensation. Also, from the viewpoint of providing a softer tactile sensation to the user, the hardness of the silicone rubber may be, for example, A40 or less.

Also, from the viewpoint of enabling the user to easily feel a soft tactile sensation when the user operates outer cover member 10, cushion layer 13 has a large height (the length of cushion layer 13 in the Z axis direction). Cushion layer 13 may have, for example, a height larger than that of design sheet 12 (for example, sheet member 12a). Also, cushion layer 13 may have a height larger than that of outer cover 11. The height relationship of cushion layer 13 with respect to outer cover 11 and design sheet 12 is not limited thereto, and may be determined as appropriate according to the material or the like.

In the present embodiment, cushion layer 13 is formed without using a foamable resin or the like. A cushion material obtained by foaming a foamable resin may internally include voids that have different sizes, different shapes, and the like. Accordingly, it may be difficult to maintain the in-plane operational load at a constant level. That is, with a cushion material obtained by foaming a foamable resin, the operability is more likely to vary from operational position to operational position in outer cover 11, as compared with a silicone rubber. On the other hand, in the present embodiment, cushion layer 13 is formed using a silicone rubber, and it is therefore possible to easily maintain the in-plane operational load at a constant level. Accordingly, input device 1 with an improved operability can be achieved as compared with the case where the cushion layer is formed using a foamable resin or the like.

As described above, outer cover 11 and cushion layer 13 are each formed to extend over light transmission portions 12b1 and light blocking portion 12b2 when viewed in a plan view. It can also be said that outer cover 11 and cushion layer 13 are each formed to extend over first regions 10a and second region 10b when viewed in a plan view. It can also be said that outer cover 11 and cushion layer 13 are each formed to extend over the switch portions and the non-switch portion when viewed in a plan view.

In the present embodiment, outer cover 11 and cushion layer 13 cover entire design sheet 12 when viewed in a plan view. For example, outer cover 11, design sheet 12, and cushion layer 13 may have the same size when viewed in a plan view. Outer cover member 10 has a three-layer structure that includes outer cover 11, design sheet 12, and cushion layer 13 in a region that can be touched by the user when viewed in a plan view. For example, outer cover member 10 is configured such that a cross-sectional structure of first region 10a and a cross-sectional structure of second region 10b have a three-layer structure that includes outer cover 11, design sheet 12, and cushion layer 13, and, in each layer, a portion corresponding to first region 10a and a portion corresponding to second region 10b are made of the same material.

Also, outer cover 11, design sheet 12, and cushion layer 13 are stacked, for example, in contact with each other. Also, outer cover 11, design sheet 12, and cushion layer 13 are held by main body 20 such that, for example, their tabular portions are parallel to each other.

Outer cover 11, design sheet 12, and cushion layer 13 are in a rectangular shape when viewed in a plan view, but there is no particular limitation on the shape of outer cover 11, design sheet 12, and cushion layer 13. Outer cover 11, design sheet 12, and cushion layer 13 may be in a square shape, a circular shape, an L shape, or the like. Also, outer cover 11 and cushion layer 13 do not necessarily need to cover entire design sheet 12 when viewed in a plan view, and may cover at least one first region 10a and second region 10b.

In the foregoing description, an example was described in which design layer 12b is formed on sheet member 12a. However, the configuration is not limited thereto. In the case where outer cover 11 is formed by using a material capable of forming design layer 12b through printing, design layer 12b may be formed directly on outer cover 11 through printing. Design layer 12b may be formed on the surface of outer cover 11 (the surface of outer cover 11 that is on the plus side of the Z axis). In the case where outer cover 11 has light transmission properties, design layer 12b may be formed on the back surface of outer cover 11 (the surface of outer cover 11 that is on the minus side of the Z axis).

In the case where design layer 12b is formed on outer cover 11, outer cover member 10 need not include sheet member 12a. That is, the design portion may be formed by design layer 12b formed (for example, printed) on outer cover 11. Also, for example, in the case where design layer 12b is formed on outer cover 11, outer cover 11 and cushion layer 13 may be directly stacked.

Frame body 14 is a frame-shaped member that has rigidity, and supports the outer edge portions of outer cover 11, design sheet 12, and cushion layer 13.

In FIG. 3, the illustration of fixing members, such as screw 15, for fixing the structural elements is omitted.

[3. Configuration of Frame Member]

Figure 4:
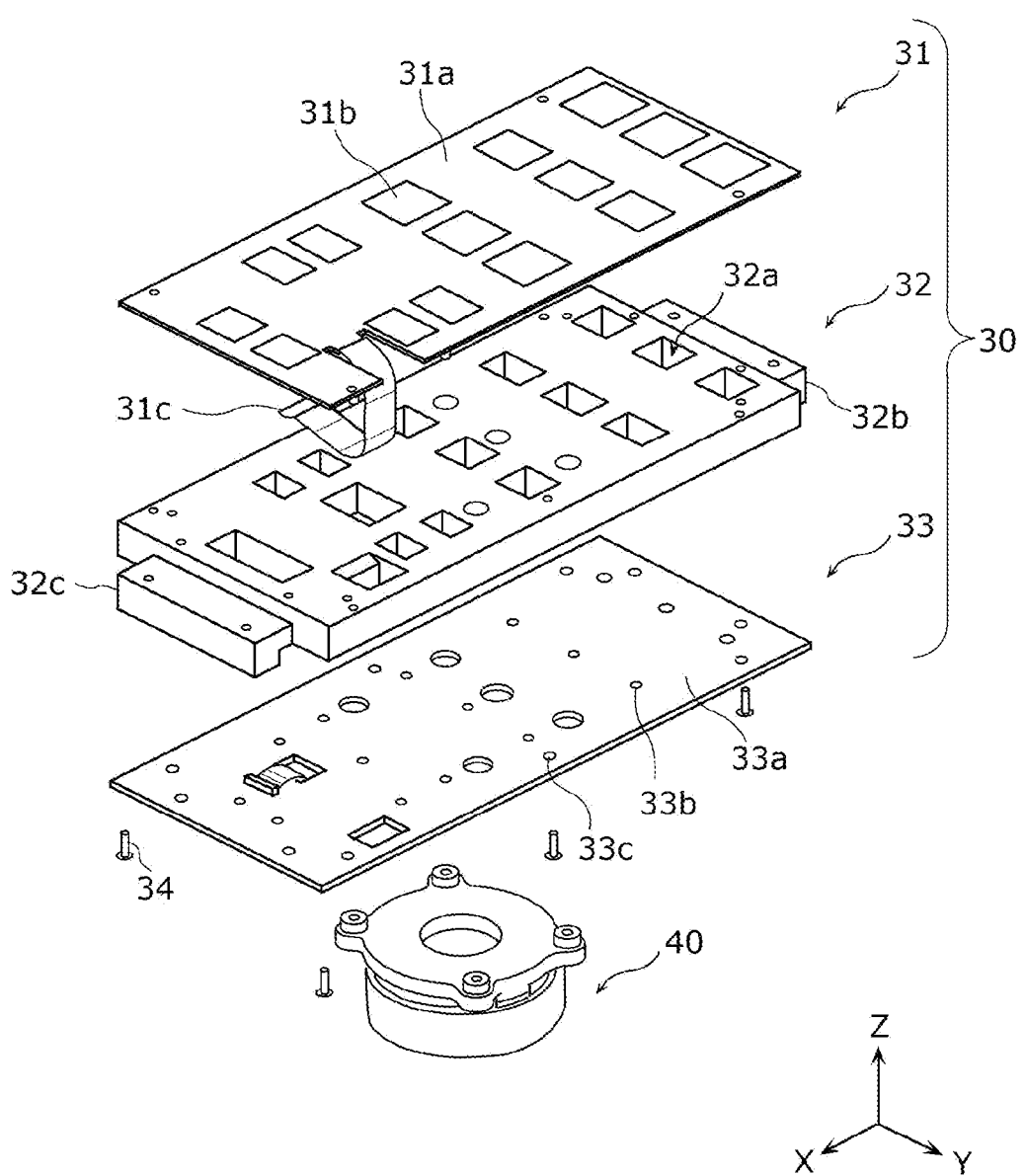
FIG. 4 is an exploded perspective view of a frame member according to the embodiment.

Next, the configuration of frame member 30 will be further described with reference to FIG. 4. FIG. 4 is an exploded perspective view of frame member 30 according to the present embodiment. In FIG. 4, vibration device 40 is also illustrated.

As shown in FIG. 4, frame member 30 includes sensor film 31, frame 32, and light source 33. Frame member 30 is provided to face outer cover member 10. Also, vibration device 40 is provided on a surface of light source 33 that is opposite to outer cover 11 (the surface of light source 33 that is on the minus side of the Z axis).

Sensor film 31 is a part of a detector that detects an operation from the user. Specifically, sensor film 31 is a sensor that is provided on a surface of cushion layer 13 that is opposite to outer cover 11 (the surface of cushion layer 13 that is on the minus side of the Z axis) to detect an operation position in outer cover 11 operated (pressed) by the user. Sensor film 31 is provided between cushion layer 13 and frame 32. In the present embodiment, sensor film 31 is an electrostatic capacitance type sensor film (electrostatic sensor film) that has light transmission properties. Sensor film 31 covers both light transmission portions 12b1 of design sheet 12 in which design elements are provided and light blocking portion 12b2 of design sheet 12 in which no design element is formed from the back surface of sheet member 12a (from the surface of sheet member 12a that is on the minus side of the Z axis) when viewed in a plan view. It can also be said that sensor film 31 is formed to extend over light transmission portions 12b1 and light blocking portion 12b2 when viewed in a plan view. Sensor film 31 covers, for example, entire design sheet 12 when viewed in a plan view. Sensor film 31 is formed by integrally forming, for example, portions that cover light transmission portions 12b1 and a portion that covers light blocking portion 12b2.

Sensor film 31 includes tabular substrate 31a, sensor electrodes 31b that are provided on substrate 31a, and flexible substrate portion 31c for connecting to main substrate 70. In the present embodiment, substrate 31a and sensor electrodes 31b have light transmission properties. That is, in the present embodiment, substrate 31a is a transparent substrate, and sensor electrodes 31b are transparent electrodes. It can also be said that sensor electrodes 31b are electrostatic sensor electrodes.

Substrate 31a is a film on which sensor electrodes 31b are formed. The film may be, for example, a PET (polyethylene terephthalate) film. Substrate 31a does not necessarily need to be a film, and may be a transparent substrate.

Sensor electrodes 31b are provided correspondingly to the plurality of design elements formed in design sheet 12. For example, sensor electrodes 31b are provided at positions that face the plurality of design elements, respectively. Each sensor electrode 31b is provided to at least partially overlap a corresponding one of the design elements when viewed in a plan view. For example, each sensor electrode 31b is provided to incorporate a corresponding one of the design elements when viewed in a plan view. For example, sensor electrodes 31b are provided in one-to-one correspondence with the design elements.

The configuration is not limited to the above-described example in which a plurality of sensor electrodes 31b are provided. For example, in the case where there is only one design element, only one sensor electrode 31b may be provided.

For example, each first region 10a may be a region in which sensor electrode 31b is provided when viewed in a plan view. Also, for example, second region 10b may be a region in which sensor electrode 31b is not provided when viewed in a plan view.

Sensor film 31 does not necessarily need to be an electrostatic capacitance type sensor film, and may have a configuration that detects an operation position in outer cover member 10 operated by the user, by using an ultrasonic method, an electromagnetic induction method, or any other method.

Flexible substrate portion 31c is a substrate for outputting detection results obtained from sensor electrodes 31b to main substrate 70. Sensor film 31 and main substrate 70 are electrically connected as a result of one end of flexible substrate portion 31c being connected to a connector or the like of main substrate 70.

Sensor film 31 may further include an electrostatic IC (integrated circuit) (not shown) that is a processor that detects a contact position touched by a user's finger based on changes in electrostatic capacitance caused by the user touching outer cover 11. For example, the electrostatic IC outputs, to controller 110, position information indicating the position touched by the user's finger.

Frame 32 moves in the minus direction of the Z axis by as a result of being pressed in the minus direction of the Z axis by outer cover member 10 operated by the user. Frame 32 is a tabular member provided on a side (on the minus side of the Z axis) opposite to outer cover 11 relative to cushion layer 13. In the present embodiment, frame 32 is provided between sensor film 31 and light source 33. Frame 32 has rigidity. Also, in the present embodiment, frame 32 has light transmission properties.

Frame 32 is provided to cover outer cover 11, design sheet 12, and cushion layer 13 when viewed in a plan view. Frame 32 is formed to extend over first regions 10a and second region 10b when viewed in a plan view. In the present embodiment, frame 32 covers the entire tabular portions (the portions to be touched by the user) of outer cover 11, design sheet 12, and cushion layer 13 when viewed in a plan view. With this configuration, frame 32 moves in the minus direction of the Z axis in the same manner irrespective of whether first region 10a or second region 10b is operated by the user. That is, frame 32 also moves when second region 10b is operated by the user. Frame 32 is held by main body 20 to be, for example, parallel to cushion layer 13.

In frame 32, through holes 32a that are spaces for the light emitted from light source 33 to pass through are formed. Through holes 32a are provided, for example, correspondingly to a plurality of light emitting elements 33b included in light source 33. It can also be said that through holes 32a are provided, for example, correspondingly to the design elements formed in design sheet 12. Also, the light is transmitted via through holes 32a, and thus it can be said that frame 32 has light transmission properties.

In the present embodiment, each of the design elements formed in design sheet 12 is smaller than a fingertip, and thus through holes 32a are also sized to be smaller than a fingertip as with the design elements. Accordingly, a situation is unlikely to occur in which the user has difficulty in pressing due to outer cover member being bent when the user performs a press operation. However, in the case where each of the design elements and through holes 32a is sized to be larger than a fingertip, and outer cover member 10 is bent when the user performs a press operation, a light guiding member (not shown) for guiding the light emitted from each light emitting element 33b may be formed for each through hole 32a. That is, frame 32 may include light guiding members in portions of frame 32 that face the design elements and light source 33 (for example, light emitting elements 33b). The light guiding members are not limited to the configuration described above, and may also be used when the design elements are sized to be smaller than a fingertip.

Also, through holes 32a do not necessarily need to be formed in frame 32, and through holes 32a may not need to be formed in frame 32. In this case, for example, frame 32 is formed by two-color molding a light transmission resin and a light blocking resin.

Also, frame 32 includes end portion 32b that is a projection portion that protrudes in the minus side of the X axis and end portion 32c that is a projection portion that protrudes in the plus side of the X axis. End portions 32b and 32c are portions that abut against, for example, plate spring 50.

Sensor film 31 and light source 33 are fixed to frame 32 by using, for example, fastening members such as screws.

Light source 33 is provided on a surface of frame 32 opposite to cushion layer 13 (on the minus side of the Z axis) to illuminate the design elements. Light source 33 includes substrate 33a and a plurality of light emitting elements 33b.

Substrate 33a is a tabular member on which the plurality of light emitting elements 33b are provided. Substrate 33a is a rigid substrate, but may be a flexible substrate.

Light emitting elements 33b emit light for displaying the design elements. Light emitting elements 33b are provided correspondingly to the plurality of design elements. Light emitting elements 33b are provided, for example, at positions in substrate 33a that face the plurality of design elements. Light emitting elements 33b are, for example, LEDs (light emitting diodes), but are not limited thereto.

The plurality of light emitting elements 33b may emit light beams of different colors (for example, colors corresponding to the design elements) or may emit light beams of one color (for example, white).

Screws 34 are fastening members for fixing substrate 33a to frame 32.

In the present embodiment, vibration device 40 is fixed to frame member 30 together with substrate 33a. Accordingly, substrate 33a and vibration device 40 are provided to come into direct contact with frame member 30 irrespective of whether frame member 30 moves in the minus direction of the Z axis.

When outer cover member 10 is operated by the user, frame member 30 configured as described above moves in the Z axis direction, for example, together with sensor film 31, frame 32, and light source 33 described above.

Sensor film 31 is not an essential structural element.

[4. Cross-Sectional Structure of Input Device]

Figure 5:
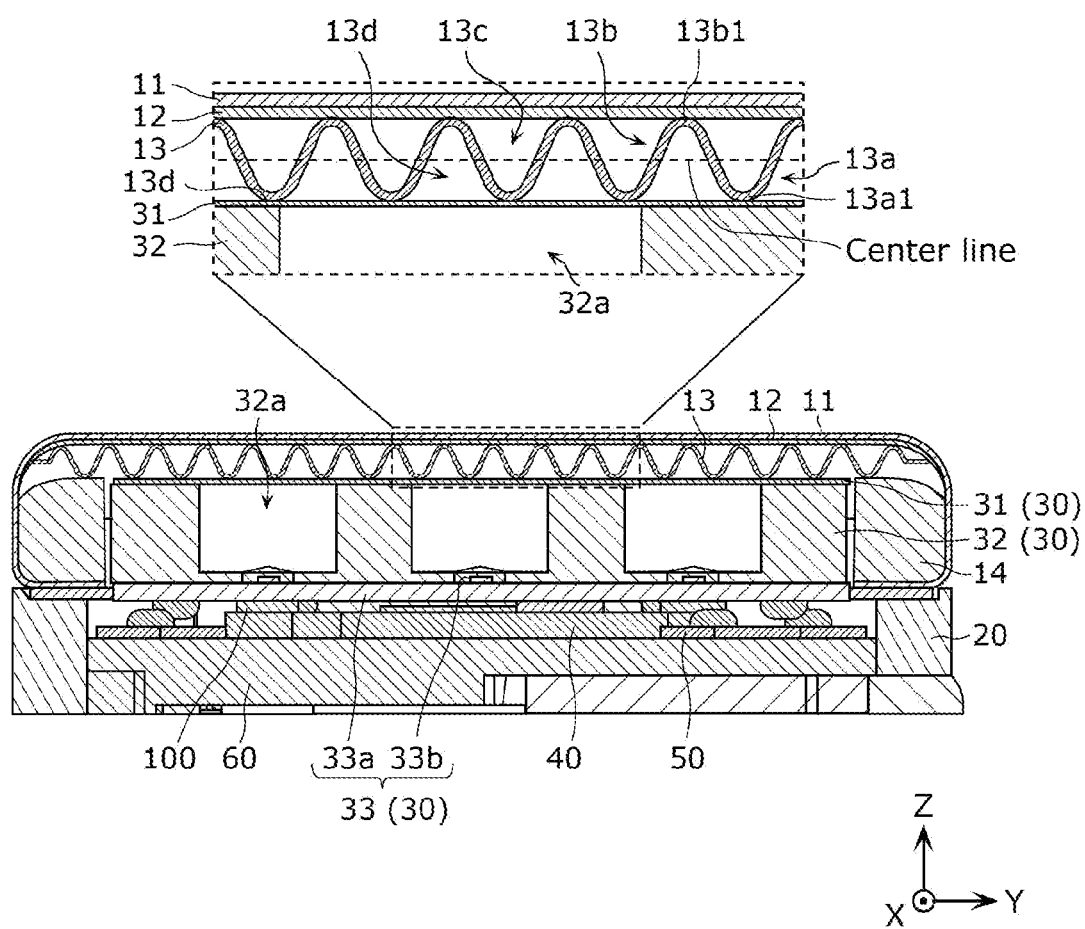
FIG. 5 is a cross-sectional view of the input device according to the embodiment.

Next, a cross-sectional structure of input device 1 will be further described with reference to FIG. 5. FIG. 5 is a cross-sectional view of input device 1 according to the present embodiment. FIG. 5 is a cross-sectional view of input device 1 in a state in which outer cover member 10 is not operated by the user, or in other words, the initial state. FIG. 5 shows a cross-sectional view of input device 1 taken along the YZ plane that is parallel to the Z axis direction.

As shown in FIG. 5, in input device 1, outer cover member 10 (see, for example, FIG. 3), frame 32, light source 33, plate spring 50, and chassis 60 are held parallel to each other in this order from the front surface side (from the plus side of the Z axis). Outer cover member 10 is integrally formed to extend from an end portion on the plus side of the X axis to an end portion on the minus side of the X axis. That is, in each of first regions 10a and second region 10b (see, for example, FIG. 1), outer cover member 10 has the same structure and is formed using the same material.

The light emitted from light emitting elements 33b of light source 33 passes through through holes 32a and outer cover member and is emitted to the outside of input device 1. With this configuration, input device 1 enables the user to visually recognize indications corresponding to the design elements formed on design sheet 12.

Also, input device 1 may further include, on the opposite side of outer cover member 10 (on the minus side of the Z axis) relative to frame member 30, push detector 100 for detecting an operation of the user performed on outer cover member 10. Push detector 100 may be, for example, a tact switch. Push detector 100 is provided, for example, at an end portion of substrate 33a in the X axis direction, but the configuration is not limited thereto. Push detector 100 is mechanically connected to frame 32. As used herein, the expression "push detector 100 is mechanically connected to frame 32" means that push detector 100 can detect the movement of frame 32 in the minus direction of the Z axis.

Push detector 100 is provided on the back surface side (on the minus side of the Z axis) of cushion layer 13, and detects an operation (for example, a press operation) from the user. Push detector 100 is configured to detect an operation from the user when, for example, outer cover 11 is further pressed while cushion layer 13 is compression-deformed. Push detector 100 is configured to detect an operation from the user when, for example, a predetermined load or more is applied to outer cover 11. For example, push detector 100 is configured to, when outer cover 11 is further pressed while cushion layer 13 is compression-deformed, detect the pressing operation. The expression "while cushion layer 13 is compression-deformed" means a state in which cushion layer 13 is compression-deformed to a predetermined degree or more, and may encompass a state in which, for example, cushion layer 13 is compression-deformed to a degree that does not exceed the predetermined degree or cushion layer 13 is less compression-deformed from the initial state.

Push detector 100 may be a load sensor that detects the load applied to outer cover member 10 based on the movement of frame 32 in the minus direction of the Z axis as a result of outer cover member 10 being operated. There is no particular limitation on the load sensor as long as it is possible to detect the load applied to outer cover member 10. The load sensor may be, for example, a piezoelectric sensor. The load sensor includes, for example, a piezoelectric element. Push detector 100 may be, for example, a stroke sensor that detects the load applied to outer cover member 10 as the amount of displacement of frame member 30 (for example, frame 32). The stroke sensor detects the amount of displacement of frame member 30 as a stroke amount by using, for example, an optical sensor, a radio wave sensor, a sonic sensor, or the like. The stroke sensor can detect a small stroke amount as small as, for example, about 0.1 mm. The stroke sensor may determine that the user has operated outer cover member 10 when the stroke sensor detects a small stroke amount as small as, for example, about 0.1 mm. The tact switch used in the present embodiment can also detect a stroke amount of about 0.1 mm to about 0.2 mm. Push detector 100 outputs the detection result to controller 110, which will be described later.

Push detector 100 may be a contact type push detector or a contactless type push detector. Push detector 100 may be an electrostatic capacitance type push detector or a mechanical push detector. In the case where input device 1 includes a switch such as a tact switch, sensors such as the load sensor described above may be omitted. Push detector 100 is an example of a detector.

Also, when viewed in a cross section taken along a plane parallel to the stack direction (the Z axis direction) in which outer cover 11 and design sheet 12 are stacked, cushion layer 13 is formed to have a plurality of concave portions that are in a convex shape in the stack direction and a concave shape on the opposite side of the convex shape. Specifically, when viewed in a cross section taken along a plane parallel to the stack direction of outer cover 11 and design sheet 12, cushion layer 13 is formed to have a plurality of first concave portions 13a and a plurality of second concave portions 13b, the plurality of first concave portions 13a being in a convex shape in a first orientation (from the plus side of the Z axis toward the minus side of the Z axis) in the stack direction relative to a center line (see FIG. 6) that is orthogonal to the stack direction and a concave shape on the opposite side of the convex shape in the first orientation, and the plurality of second concave portions 13b being connected to first concave portion 13a and being in a convex shape in a second orientation (from the minus side of the Z axis toward the plus side of the Z axis) that is opposite to the first orientation in the stack direction relative to the center line and a concave shape on the opposite side of the convex shape in the second orientation. Also, cushion layer 13 also includes at least either first concave portions 13a or second concave portions 13b, for example, above frame body 14 (on the plus side of the Z axis).

The center line is an imaginary line that extends through the center of height A of cushion layer 13 (see FIG. 6) and is parallel to the Y axis direction, and is an example of a reference line. The reference line does not necessarily need to extend through the center of height A, and may be an imaginary line that extends through any position of height A and is parallel to the Y axis direction. Also, the reference line does not necessarily need to be orthogonal to the stack direction, and may be parallel to a direction that intersects the stack direction when viewed in a cross section.

In cushion layer 13, a plurality of first concave portions 13a are arranged spaced apart from each other on the first orientation side relative to the center line, and a plurality of second concave portions 13b are arranged spaced apart from each other on the second orientation side relative to the center line. In cushion layer 13, first concave portions 13a and second concave portions 13b are alternately and successively formed when viewed in a cross section taken along the YZ plane. That is, first concave portions 13a and second concave portions 13b are provided alternately in the Y axis direction (an example of a first direction). For example, the plurality of first concave portions 13a and the plurality of second concave portions 13b form a corrugated shape (corrugated tabular shape) when viewed in a cross section taken along the YZ plane. For example, one second concave portion 13b and one first concave portion 13a that is connected to the one second concave portion 13b form the shape of a sine curve with a single frequency about the reference line when viewed in a cross section taken along the YZ plane. The corrugated shape refers to the shape of a sine curve, but may be, for example, a triangular corrugated shape (a zigzag shape) or the like.

From the viewpoint of providing, for example, a soft tactile sensation to the user, cushion layer 13 may be thin. For example, cushion layer 13 may be thinner than design sheet 12 (for example, sheet member 12a). However, the configuration is not limited thereto.

In cushion layer 13 configured as described above, spaces 13c are formed between cushion layer 13 and design sheet 12, and spaces 13d are formed between cushion layer 13 and sensor film 31. As a result of spaces 13c and 13d being formed as described above, cushion layer 13 can be easily compression-deformed in response to outer cover 11 being pressed. With this configuration, input device 1 enables the user to easily feel a soft tactile sensation.

All of the plurality of spaces 13c formed in cushion layer 13 are entirely covered by design sheet 12, and all of the plurality of spaces 13d formed in cushion layer 13 are entirely covered by sensor film 31.

Cushion layer 13 (first concave portions 13a and second concave portions 13b) is, for example, integrally formed. Cushion layer 13 is produced by, for example, molding a transparent silicone rubber. Thus, cushion layer 13 according to the present embodiment is a rubber molded article with a convex-concave cross section. However, the method for producing cushion layer 13 is not limited thereto.

Figure 6:
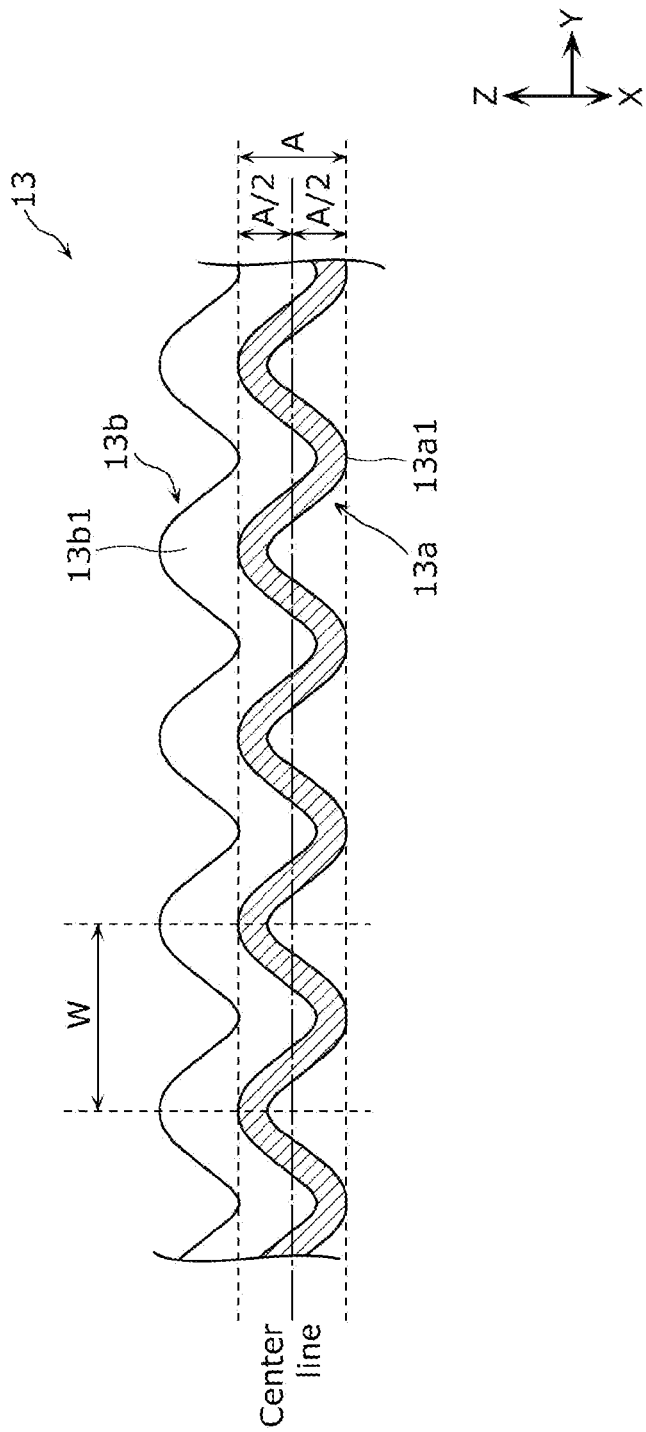
FIG. 6 is a cross-sectional perspective view of a cushion layer according to the embodiment.
Figure 7:
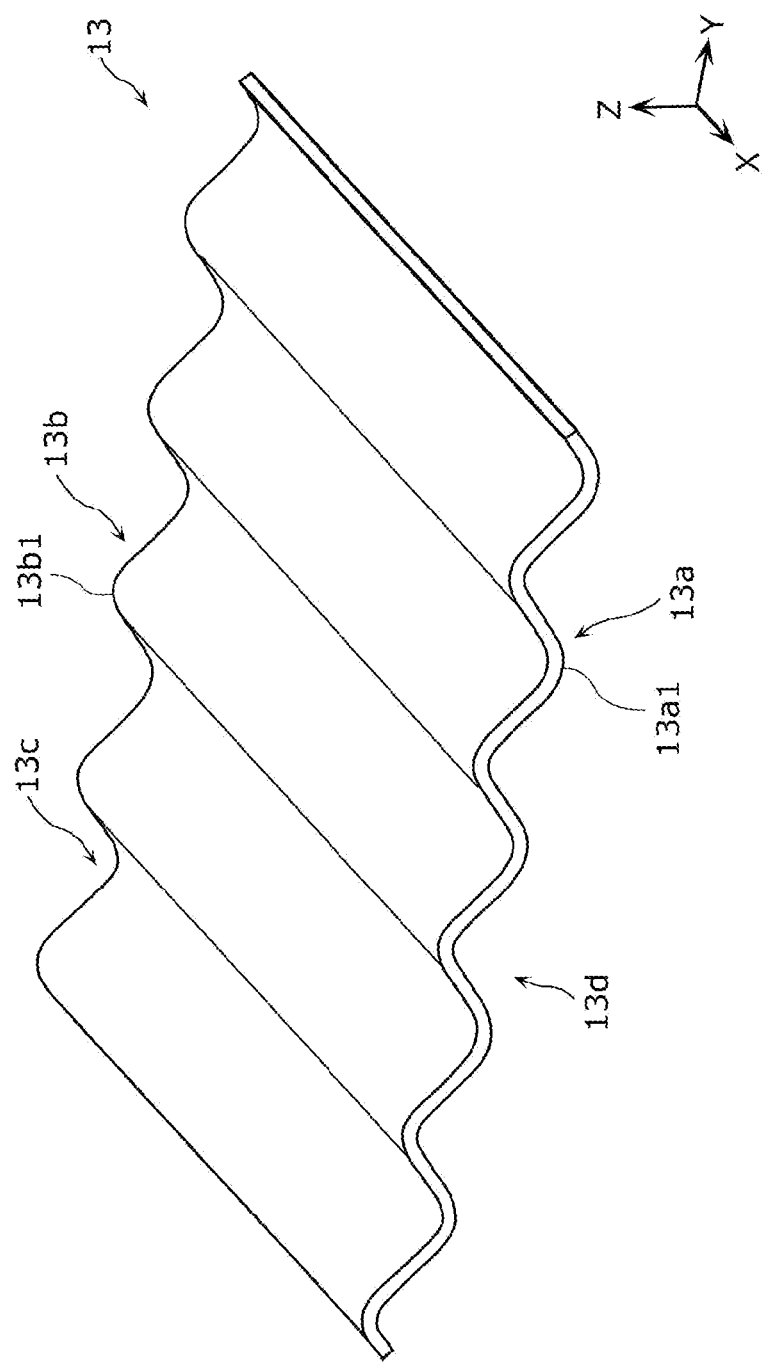
FIG. 7 is a perspective view of the cushion layer according to the embodiment.

Here, the configuration of cushion layer 13 will be further described with reference to FIGS. 6 and 7. FIG. 6 is a cross-sectional perspective view of cushion layer 13 according to the present embodiment. FIG. 7 is a perspective view of cushion layer 13 according to the present embodiment. FIG. 6 is a perspective view of cushion layer 13 taken along the YZ plane when viewed from the X axis direction toward the plus side of the Z axis.

As shown in FIGS. 6 and 7, in cushion layer 13, the plurality of first concave portions 13a and the plurality of second concave portions 13b extend in the X axis direction when input device 1 is viewed in a plan view. It can be said that, in cushion layer 13, first concave portions 13a and second concave portions 13b are alternately (for example, successively) provided in the Y axis direction, and the plurality of first concave portions 13a and the plurality of second concave portions 13b that are alternately provided in the Y axis direction extend in a direction (an example of a second direction) that intersects the Y axis direction when input device 1 is viewed in a plan view. The direction that intersects the Y axis direction is, for example, the X axis direction that is orthogonal to the Y axis direction, but is not limited thereto.

The plurality of first concave portions 13a and the plurality of second concave portions 13b extend in a direction parallel to each other. In other words, in cushion layer 13, a plurality of spaces 13c and a plurality of spaces 13d extend in a direction is parallel to each other. Cushion layer 13 is a corrugated member (for example, a rubber member formed in a corrugated shape).

In cushion layer 13, for example, design sheet 12 comes into line contact with ridges 13b1 of second concave portions 13b, and sensor film 31 comes into line contact with ridges 13a1 of first concave portions 13a. As used herein, the term "line contact" means that design sheet 12 or sensor film 31 contacts ridges 13b1 or 13a1 in an elongated linear manner when viewed in a plan view, and is also intended to mean that design sheet 12 or sensor film 31 contacts ridges 13b1 or 13a1 that have been elastically deformed and flattened, in addition to contacting ridges 13b1 or 13a1 in the linear manner.

Ridges 13a1 and 13b1 are curved when viewed in a cross section.

From the viewpoint of suppressing a situation in which the user feels uncomfortable, width (pitch) W between adjacent second concave portions 13b may be small. Width W may be, for example, 4 mm or less, preferably 3 mm or less, and more preferably 2 mm or less. Also, from the viewpoint of enabling the user to easily feel a soft tactile sensation when the user operates outer cover member 10, height A of cushion layer 13 may be large. Height A may be, for example, 2 mm or more, preferably 3 mm or more, and more preferably 4 mm or more. Also, width W and height A may be the same length.

When outer cover member 10 configured as described above is operated by the user, outer cover 11 and design sheet 12 are bent in the minus side of the Z axis, and cushion layer 13 is compressed in the minus side of the Z axis. That is, outer cover member 10 is locally deformed when outer cover member 10 is operated by the user. As a result of cushion layer 13 being compressed, it is possible to cause the user to feel a soft tactile sensation. Outer cover member 10 includes cushion layer 13 integrally formed over first regions 10a and second region 10b, and thus, irrespective of whether first region 10a or second region 10b is operated (for example, touched) by the user, it is possible to cause the user to feel the same soft tactile sensation.

Also, when outer cover 11 is pressed, cushion layer 13 is bent such that portions (slope portions) between ridges 13a1 and 13b1 that have been pressed are flattened toward the outside when viewed in a plan view, as a result of which, cushion layer 13 is compression-deformed such that cushion layer 13 becomes thin in thickness. It can also be said that cushion layer 13 undergoes buckling deformation. Because the thickness of cushion layer 13 becomes partially thin (the height is reduced), the user can press outer cover 11 with a pressing force smaller than that required when the thickness of cushion layer 13 becomes entirely thin. That is, as a result of input device 1 including cushion layer 13, the operability can be improved in addition to enabling the user to feel a soft tactile sensation.

Also, because frame member 30 is integrally formed over first regions 10a and second region 10b, and has rigidity, frame member moves in the minus direction of the Z axis without being deformed irrespective of whether first region 10a or second region 10b is operated (for example, touched) by the user. Accordingly, with frame member 30, the user is less likely to feel the difference in tactile sensation between when frame member 30 moves and when frame member 30 does not move, as compared with a configuration in which, for example, frame member 30 does not move when second region 10b is operated.

With the configuration described above, input device 1 can provide the same soft tactile sensation to the user no matter where in outer cover member 10 the user touches (presses). It is therefore possible to suppress a situation in which the user feels uncomfortable with the tactile sensation. For example, in the case where input device 1 is provided in a place where the user can unconsciously touch such as an armrest, it is possible to suppress a situation in which the user feels uncomfortable with the tactile sensation. For example, input device 1 can provide the same tactile sensation to the user no matter where in outer cover member 10 the user touches when light source 33 is in a non-illuminated state. Accordingly, it is possible to suppress a situation in which the user feels uncomfortable with the tactile sensation. That is, even when the user touches outer cover member 10 without the intention to operate any of the devices of the vehicle, the user can feel the same tactile sensation no matter where in outer cover member 10 the user touches.

Also, cushion layer 13 is compression-deformed by, for example, the user operating outer cover member 10. That is, cushion layer 13 is compressed when vibrations are generated by vibration device 40. Accordingly, with input device 1, the vibrations of vibration device 40 are unlikely to be absorbed by cushion layer 13, and it is therefore possible to effectively transmit the tactile sensation of vibration device 40 to the user (user's finger). Also, in the case where input device 1 includes a tact switch, a click sensation generated by the tact switch is unlikely to be absorbed by cushion layer 13, and thus input device 1 can effectively transmit the click sensation to the user. That is, input device 1 can reduce uncomfortableness of the user with the tactile sensation, without compromising the haptic sensation provided to the user.

Also, cushion layer 13 is formed to have the plurality of first concave portions 13a and the plurality of second concave portions 13b described above when viewed in a cross section taken along the YZ plane. For example, the plurality of first concave portions 13a and the plurality of second concave portions 13b form a corrugated shape. Thus, the slope angle of each portion (slope portion) between ridges 13a1 and 13b1 of cushion layer 13 relative to the center line (reference line) can be reduced (made gentle), and a difference is unlikely to occur in brightness between the light that passes through ridges 13a1 and 13b1 of cushion layer 13 and the light that passes through the portions (slope portions) between ridges 13a1 and 13b1 of cushion layer 13. Accordingly, with cushion layer 13, it is possible to suppress the occurrence of brightness variations caused by the shape of cushion layer 13.

[5. Functional Configuration of Input Device]

Figure 8:
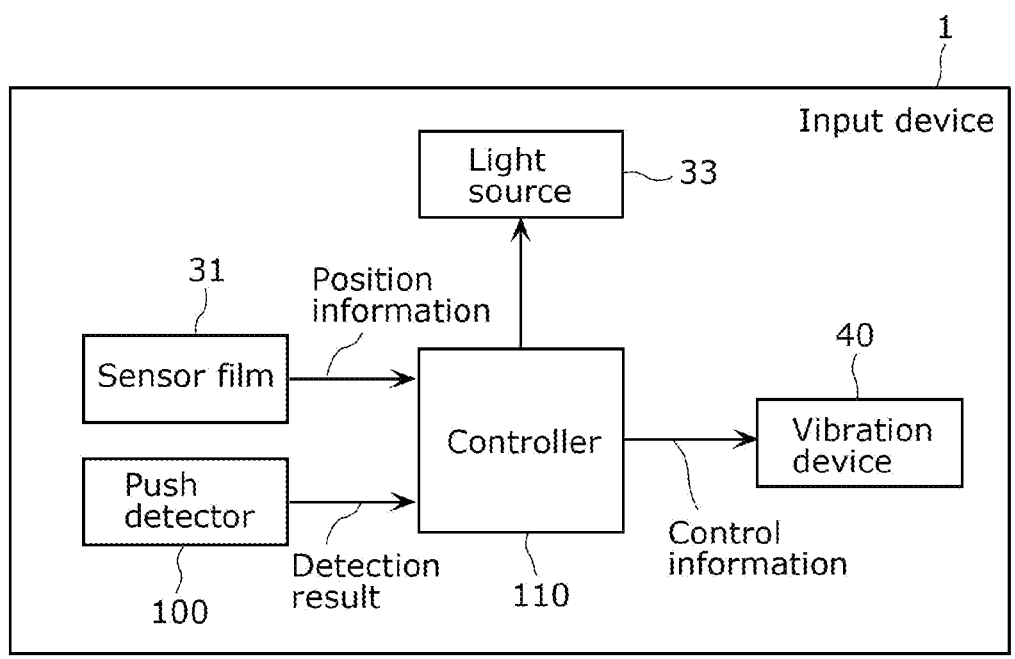
FIG. 8 is a block diagram showing a functional configuration of the input device according to the embodiment.

Next, a functional configuration of input device 1 will be described with reference to FIG. 8. FIG. 8 is a block diagram showing the functional configuration of input device 1 according to the present embodiment.

As shown in FIG. 8, input device 1 includes, as functional structural elements, sensor film 31, light source 33, vibration device 40, push detector 100, and controller 110.

Controller 110 is a control device that controls the structural elements of input device 1. Controller 110 controls light source 33 to emit light to display the design elements. Also, controller 110 determines, based on position information from sensor film 31, which design element has been operated by the user, and performs control processing that corresponds to the design element operated by the user. Controller 110 may perform the processing performed by the electrostatic IC described above.

Also, when controller 110 acquires a detection result indicating that the user has operated outer cover member 10 from push detector 100, controller 110 outputs control information for causing vibration device 40 to vibrate. For example, controller 110 acquires a detection result indicating that the user has operated outer cover member 10 from push detector 100, and then acquires the position (the design element) operated by the user based on the position information from sensor film 31. Then, controller 110 outputs a control signal that corresponds to the design element operated by the user to the outside. Furthermore, controller 110 may cause vibration device 40 to vibrate in a manner (for example, frequency, vibration intensity, and the like) that corresponds to the design element operated by the user.

When second region 10b is operated by the user, controller 110 acquires a detection result from push detector 100, but does not acquire position information from sensor film 31. In this case, controller 110 does not output control information for causing vibration device 40 to vibrate. That is, controller 110 does not cause vibration device 40 to vibrate. Controller 110 outputs control information for causing vibration device 40 to vibrate when, for example, controller 110 acquires both position information from sensor film 31 and a detection result from push detector 100.

Controller 110 may be implemented by using, for example, a processor that executes a program for controlling the structural elements and a memory in which the program is stored, or may be implemented by using a dedicated circuit. Controller 110 may be implemented by using, for example, an ECU (Electronic Control Unit).

VARIATIONS OF THE EMBODIMENT

Hereinafter, variations of input device 1 according to the embodiment will be described with reference to FIGS. 9 to 16. In the variations given below, differences from the embodiment will be mainly described, and thus the same or similar description as that of the embodiment will be omitted or simplified. Also, in each of the variations given below, the configuration of the cushion layer is changed from that of the embodiment.

(Variation 1 of the Embodiment)

Figure 9:
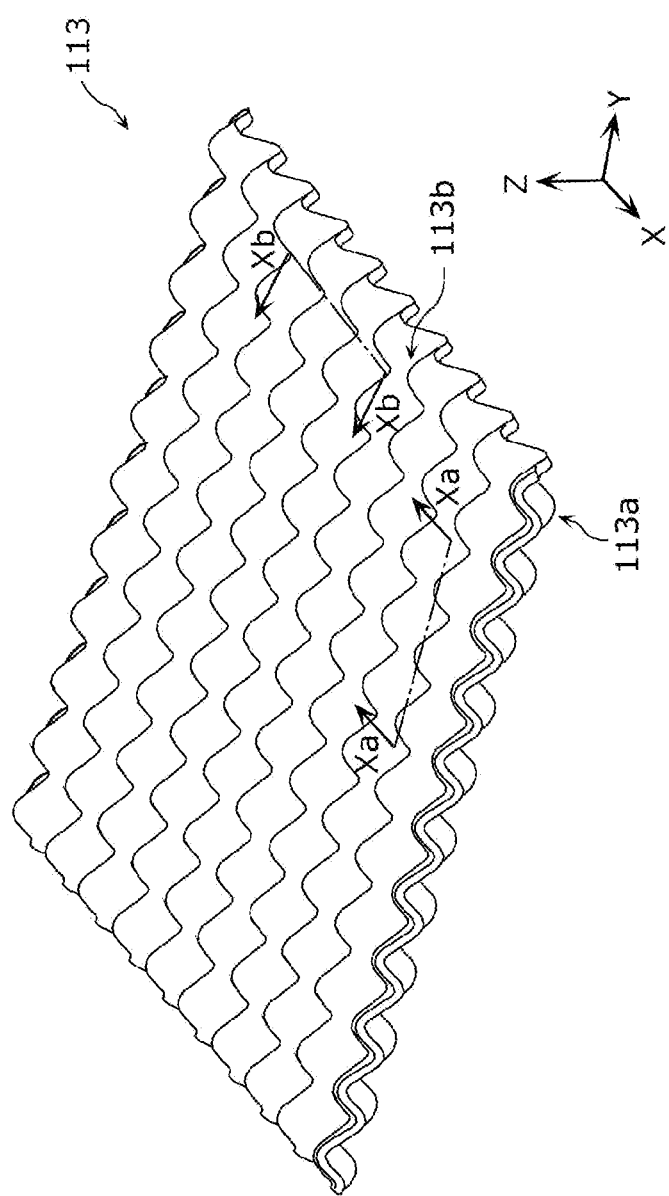
FIG. 9 is a perspective view of a cushion layer according to Variation 1 of the embodiment.
Figure 10A:
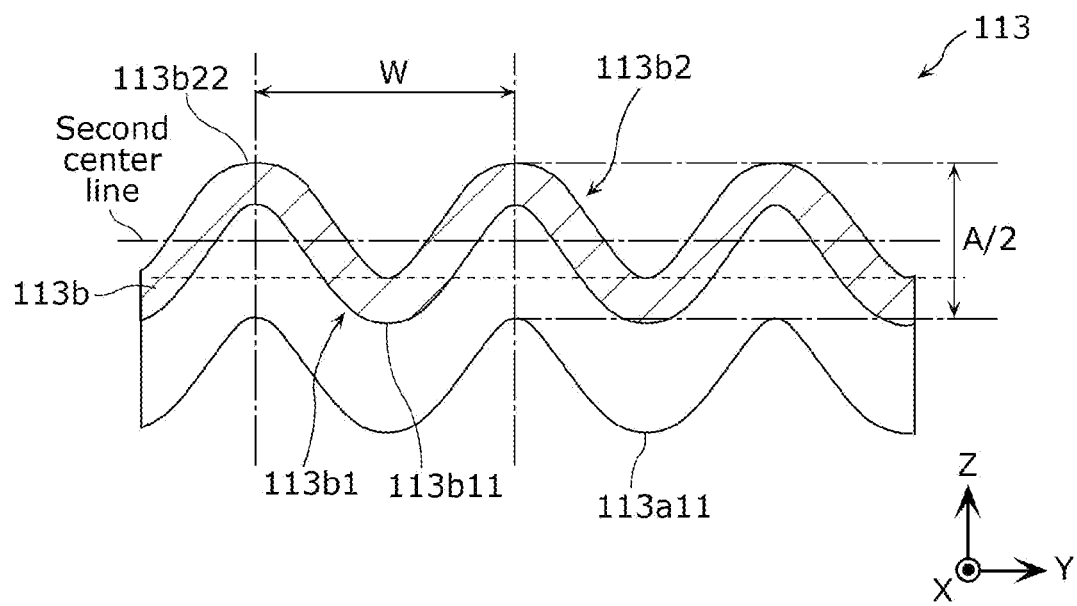
FIG. 10A is a cross-sectional view of the cushion layer according to Variation 1 of the embodiment taken along the section line Xa-Xa shown in FIG. 9.
Figure 10B:
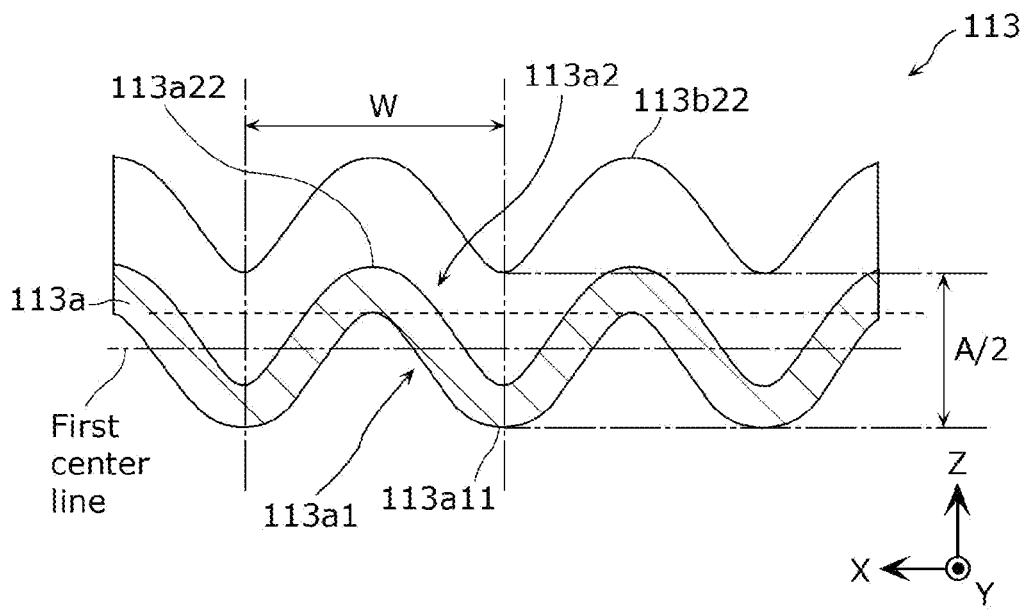
FIG. 10B is a cross sectional view of the cushion layer according to Variation 1 of the embodiment taken along the section line Xb-Xb shown in FIG. 9.

In the embodiment given above, an example was described in which the cushion layer is configured by using one corrugated member. However, the configuration is not limited thereto. The cushion layer may be configured by using a member in which convex portions and concave portions are two-dimensionally formed. Input device 1 according to the present variation will be described with reference to FIGS. 9 to 10B. FIG. 9 is a perspective view of cushion layer 113 according to the present variation. FIG. 10A is a cross-sectional view of cushion layer 113 according to the present variation taken along the section line Xa-Xa shown in FIG. 9. FIG. 10B is a cross-sectional view of cushion layer 113 according to the present variation taken along the section line Xb-Xb shown in FIG. 9. FIG. 10A is a cross-sectional view of cushion layer 113 taken along a second row of second corrugation 113$b$ in which first concave portions 113$b$1 and second concave portions 113$b$2 of second corrugation 113$b$ are arranged. FIG. 10B is a cross-sectional view of cushion layer 113 taken along a first row of first corrugation 113$a$ in which first concave portions 113$a$1 and second concave portions 113$a$2 of first corrugation 113$a$ are arranged.

As shown in FIGS. 9 to 10B, cushion layer 113 includes: a plurality of first concave portions 113$a$1 and a plurality of second concave portions 113$a$2 that are two-dimensionally arranged; and a plurality of first concave portions 113$b$1 and a plurality of second concave portions 113$b$2 that are two-dimensionally arranged. In the present variation, a first row of first corrugation 113$a$ in which first concave portions 113$a$1 and second concave portions 113$a$2 of first corrugation 113$a$ are successively arranged (see FIG. 10B) and a second row of second corrugation 113$b$ in which first concave portions 113$b$1 and second concave portions 113$b$2 of second corrugation 113$b$ are successively arranged (see FIG. 10A) are alternately provided in each of the X axis direction and the Y axis direction. For example, first corrugation 113$a$ and second corrugation 113$b$ are arranged such that first concave portions 113$a$1 of first corrugation 113$a$ and second concave portions 113$b$2 of second corrugation 113$b$ are provided in a zigzag shape in each of the X axis direction and the Y axis direction when viewed in a plan view. Cushion layer 113 has a corrugated shape when viewed from the X axis direction and also when viewed from the Y axis direction. First concave portions 113$a$1 and 113$b$1 and second concave portions 113$a$2 and 113$b$2 are an example of a plurality of concave portions. First concave portions 113$a$1 and 113$b$1, and second concave portions 113$a$2 and 113$b$2 are in a circular shape when viewed in a plan view, but may be in a polygonal shape such as, for example, a quadrilateral shape or a hexagonal shape, or any other shape when viewed in a plan view.

As shown in FIG. 10A, when viewed in a cross section taken along a plane (for example, the YZ plane) parallel to the stack direction, second corrugation 113$b$ includes first concave portions 113$b$1 and second concave portions 113$b$2. First concave portions 113$b$1 are in a convex shape in a first orientation (from the plus side of the Z axis toward the minus side of the Z axis) in the stack direction relative to a second center line that is orthogonal to the stack direction and a concave shape on the opposite side of the convex shape in the first orientation. Second concave portions 113$b$2 are connected to first concave portion 113$b$1 and are in a convex shape in a second orientation (from the minus side of the Z axis toward the plus side of the Z axis) that is opposite to the first orientation in the stack direction relative to the second center line and a concave shape on the opposite side of the convex shape in the second orientation.

In cushion layer 113, the plurality of first concave portions 113$b$1 are arranged spaced apart from each other on the first orientation side relative to the second center line, and the plurality of second concave portions 113$b$2 are arranged spaced apart from each other on the second orientation side relative to the second center line. In cushion layer 113, first concave portions 113$b$1 and second concave portions 113$b$2 are alternately and successively formed when viewed in a cross section taken along the YZ plane. That is, first concave portions 113$b$1 and second concave portions 113$b$2 are alternately provided in the Y axis direction (an example of a first direction). For example, first concave portions 113$b$1 and second concave portions 113$b$2 that are alternately provided form a corrugated shape (corrugated tabular shape) when viewed in a cross section taken along the YZ plane.

The second center line is an imaginary line that extends through the center of second corrugation 113$b$ of cushion layer 113 in the Z axis direction and is parallel to the Y axis direction, and is an example of a reference line.

The portions between ridges 113$b$11 and 113$b$22 are merely an example of slope portions. The length of ridges 113$b$11 and 113$b$22 in the Z axis direction is, for example, A/2, but is not limited thereto.

A dotted line shown in FIG. 10A is a straight line or a plane that connects the upper bottoms of first concave portions 113$b$1.

FIG. 10A shows a cross section taken along a section line extending in the Y axis direction, but cushion layer 113 also has the same shape when viewed in a cross section taken along a section line extending in the X axis direction.

As shown in FIG. 10B, when viewed in a cross section taken along a plane (for example, the YZ plane) parallel to the stack direction, first corrugation 113$a$ includes first concave portions 113$a$1 and second concave portions 113$a$2. First concave portions 113$a$1 are in a convex shape in a first orientation (from the plus side of the Z axis toward the minus side of the Z axis) in the stack direction relative to a first center line that is orthogonal to the stack direction and a concave shape on the opposite side of the convex shape in the first orientation. Second concave portions 113$a$2 are connected to first concave portion 113$a$1 and are in a convex shape in a second orientation (from the minus side of the Z axis toward the plus side of the Z axis) that is opposite to the first orientation in the stack direction relative to the first center line and a concave shape on the opposite side of the convex shape in the second orientation.

In cushion layer 113, the plurality of first concave portions 113$a$1 are arranged spaced apart from each other on the first orientation side relative to the first center line, and the plurality of second concave portions 113$a$2 are arranged spaced apart from each other on the second orientation side relative to the first center line. In cushion layer 113, first concave portions 113$a$1 and second concave portions 113$a$2 are alternately and successively formed when viewed in a cross section taken along the YZ plane. That is, first concave portions 113$a$1 and second concave portions 113$a$2 are provided alternately in the X axis direction (an example of a second direction). For example, first concave portions 113$a$1 and second concave portions 113$a$2 that are alternately provided form a corrugated shape (corrugated tabular shape) when viewed in a cross section taken along the XZ plane.

The first center line is an imaginary line that extends through the center of first corrugation 113a of cushion layer 113 in the Z axis direction and is parallel to the X axis direction, and is an example of a reference line. The first center line is a straight line that is parallel to the second center line. Also, the position of the first center line in the stack direction is different from the position of the second center line in the stack direction. The first center line is located on the first orientation side (on the minus side of the Z axis) relative to the second center line.

The portions between ridges 113a11 and 113b22 are merely an example of slope portions. The length of ridges 113a11 and 113a22 in the Z axis direction is, for example, A/2, but is not limited thereto.

A dotted line shown in FIG. 10B is a straight line or a plane that connects the lower bottoms of second concave portions 113a2.

FIG. 10B shows a cross section taken along a section line extending in the X axis direction, but cushion layer 113 also has the same shape when viewed in a cross section taken along a section line extending in the Y axis direction.

A first portion that includes ridge 113b11 shown in FIG. 10A (for example, a portion of first concave portion 113b1 on the minus side of the Z axis relative to the dotted line) and a second portion that includes ridge 113a22 shown in FIG. 10B (for example, a portion of second concave portion 113a2 on the plus side of the Z axis relative to the dotted line) are common portions in cushion layer 113. For example, the first portion and the second portion at an intersection of two section lines shown in FIG. 9 are common portions. That is, first concave portions 113a1 and second concave portions 113b2 are connected via first concave portions 113b1 and second concave portions 113a2.

Cushion layer 113 can be easily compression-deformed in response to outer cover 11 being pressed. Also, when outer cover 11 is pressed, in the X axis direction as well, the portions (slope portions) between ridges 113a22 and 113a11 are easily flattened toward the outside when viewed in a plan view. With this configuration, input device 1 enables the user to easily feel a soft tactile sensation.

First concave portions 113a1 and 113b1 have the same shape, but may have different shapes. Also, second concave portions 113a2 and 113b2 have the same shape, but may have different shapes. Also, the plurality of first concave portions 113a1 and the plurality of second concave portions 113b2 are equidistantly spaced, but may be non-equidistantly spaced. Also, the plurality of first concave portions 113b1 and the plurality of second concave portions 113a2 are equidistantly spaced, but may be non-equidistantly spaced.

(Variation 2 of the Embodiment)

Figure 11:
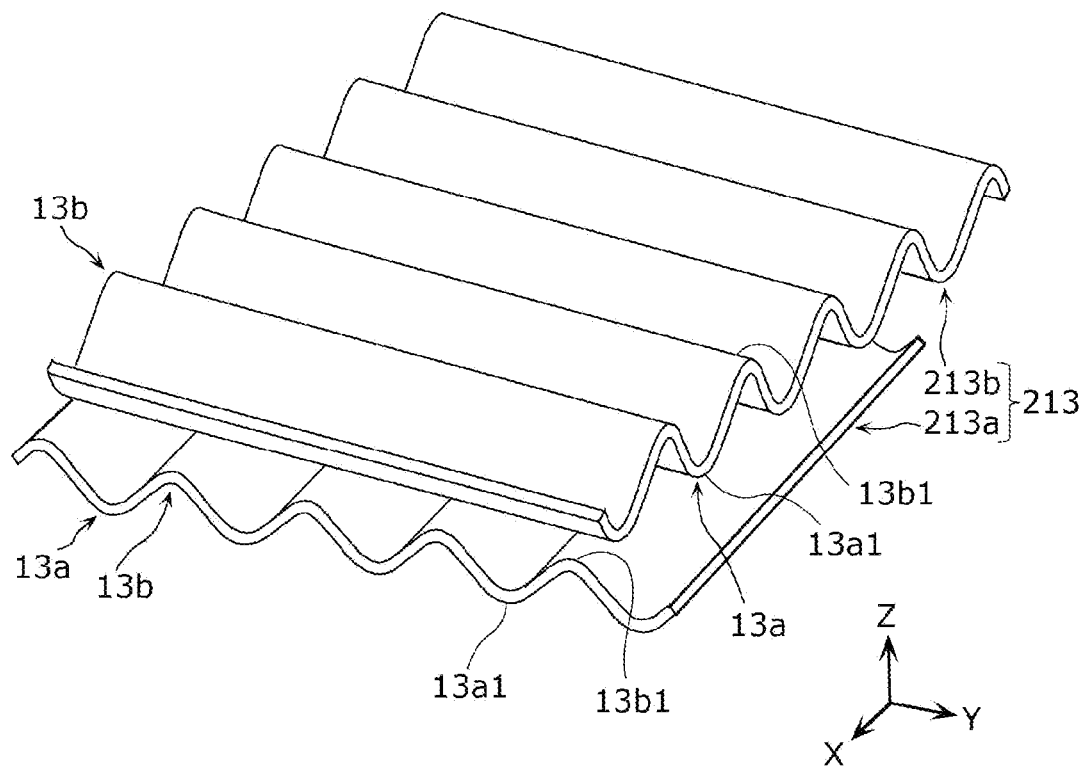
FIG. 11 is a perspective view of a cushion layer according to Variation 2 of the embodiment.

In the embodiment given above, an example was described in which cushion layer 13 is formed by using one corrugated member. However, the configuration is not limited thereto, and cushion layer 13 may be formed by using two or more corrugated members. Input device 1 according to the present variation will be described with reference to FIG. 11. FIG. 11 is a perspective view of cushion layer 213 according to the present variation.

As shown in FIG. 11, cushion layer 213 includes first corrugated member 213a and second corrugated member 213b. First corrugated member 213a has the same configuration as cushion layer 13 according to Embodiment 1, except that height A is different. Second corrugated member 213b is provided rotated from first corrugated member 213a about the Z axis (rotation axis).

First corrugated member 213a has a height lower than height A of cushion layer 13 according to the embodiment. The height of first corrugated member 213a is, for example, A/2, but is not limited thereto. The length between ridge 13a1 of first concave portion 13a and ridge 13b1 of second concave portion 13b of first corrugated member 213a in the stack direction (the Z axis direction) is less than p1, where the pitch between adjacent first concave portions 13a or adjacent second concave portions 13b of first corrugated member 213a is represented by p1 (width W).

Second corrugated member 213b has a height lower than height A of cushion layer 13 according to the embodiment. The height of second corrugated member 213b is, for example, A/2, but is not limited thereto. The length between ridge 13a1 of first concave portion 13a and ridge 13b1 of second concave portion 13b of second corrugated member 213b in the stack direction is less than p2, where the pitch between adjacent first concave portions 13a or adjacent second concave portions 13b of second corrugated member 213b is represented by p2 (width W).

In second corrugated member 213b, first concave portions 13a and second concave portions 13b are alternately (for example, successively) provided in the X axis direction (an example of a second direction), and the plurality of first concave portions 13a and the plurality of second concave portions 13b that are alternately provided in the X axis direction extend in a direction that intersects the X axis direction (an example of a third direction) when input device 1 is viewed in a plan view. The direction that intersects the X axis direction is, for example, the Y axis direction that is orthogonal to the X axis direction, but is not limited thereto.

As viewed in a plan view, a direction in which first concave portions 13a and second concave portions 13b of first corrugated member 213a extend (the direction being the X axis direction and an example of a second orientation) and a direction in which first concave portions 13a and second concave portions 13b of second corrugated member 213b extend (the direction being the Y axis direction and an example of a first orientation) intersect each other, and are orthogonal to each other in the present variation. That is, in the present variation, the first orientation and the third direction are directions that are parallel to each other when viewed in a plan view.

First corrugated member 213a and second corrugated member 213b are provided in an overlapping manner. The expression "first corrugated member 213a and second corrugated member 213b are provided in an overlapping manner" encompasses a configuration in which first corrugated member 213a and second corrugated member 213b are provided such that ridges 13b1 of second concave portions 13b of first corrugated member 213a and ridges 13a1 of first concave portions 13a of second corrugated member 213b are in contact with each other, and also encompasses a configuration in which an additional member (for example, a tabular member) is provided between first corrugated member 213a and second corrugated member 213b, and first corrugated member 213a and second corrugated member 213b are provided with the additional member interposed therebetween. First corrugated member 213a and second corrugated member 213b may be fixed by using a fixing member, or second corrugated member 213b may be simply placed on first corrugated member 213a.

An additional (for example, a tabular member) may be provided between second corrugated member 213b and design sheet 12 or between first corrugated member 213a and sensor film 31.

(Variation 3 of the Embodiment)

Figure 12:
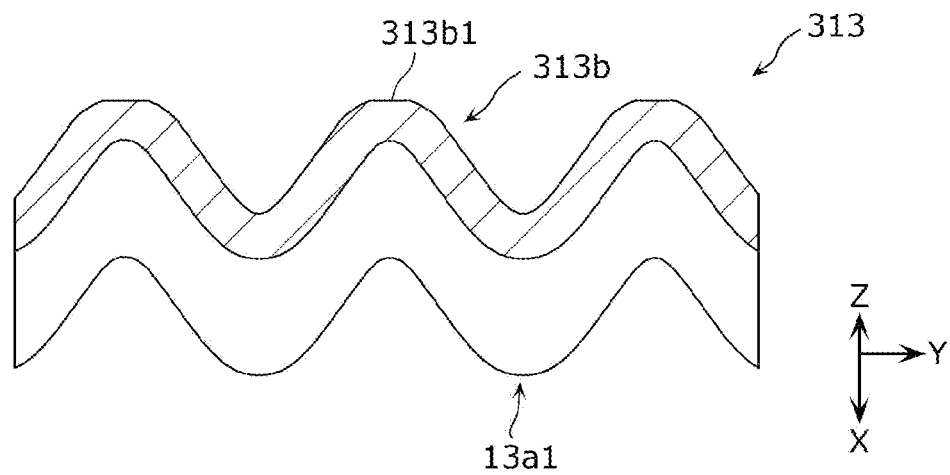
FIG. 12 is a cross-sectional perspective view of a cushion layer according to Variation 3 of the embodiment.

In the embodiment given above, an example was described in which ridges 13a1 and 13b1 of cushion layer 13 are curved when viewed in a cross section. However, the configuration is not limited thereto. Ridges 13a1 and 13b1 of cushion layer 13 may each have a flat surface. Input device 1 according to the present variation will be described with references to FIG. 12. FIG. 12 is a cross-sectional perspective view of cushion layer 313 according to the present variation. FIG. 12 is a perspective view of cushion layer 313 taken along the YZ plane when viewed from the X axis direction toward the minus side of the Z axis.

As shown in FIG. 12, in cushion layer 313, the ridges of second concave portions 313b may each have flat surface 313b1 in a state in which stress is not applied to cushion layer 313. Flat surface 313b1 has, for example, a rectangular shape that extends in the X axis direction when viewed in a plan view. Cushion layer 313 comes into surface contact with design sheet 12 by flat surfaces 313b1. As used herein, the term "surface contact" means that cushion layer 313 contacts design sheet 12 in a planar manner (for example, a rectangular shape that extends in the X axis direction) while cushion layer 313 is not compression-deformed.

Instead of or in addition to flat surface 313b1 being formed on each second concave portion 313b, a flat surface may be formed on each of ridges 13a1 of first concave portions 13a.

(Variation 4 of the Embodiment)

Figure 13:
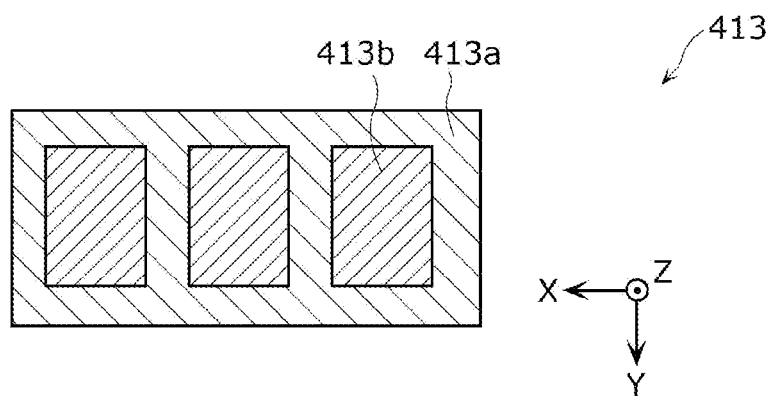
FIG. 13 is a plan view showing a configuration of a cushion layer according to Variation 4 of the embodiment.

In the embodiment given above, an example was described in which cushion layer 13 is implemented by using one structural body. However, the configuration is not limited thereto. Cushion layer 13 may be formed by fitting one or more blocks. A configuration of a cushion layer that includes one or more blocks will be described with reference to FIG. 13. FIG. 13 is a plan view showing a configuration of cushion layer 413 according to the present variation.

As shown in FIG. 13, cushion layer 413 includes main body 413a and blocks 413b. In the example shown in FIG. 13, three blocks 413b are provided. However, there is no particular limitation on the number of blocks 413b, and the number of blocks 413b may be one, two, or four or more.

Main body 413a is a tabular portion that includes which through holes (not shown) extending in the thickness direction (the Z axis direction) and in which blocks 413b are fitted into the through holes. As viewed in a plan view, main body 413a is a portion (second portion) where a region of cushion layer 413 in which no design element is formed is superimposed. Main body 413a is, for example, a portion on which second region 10b is superimposed when viewed in a plan view.

Main body 413a may have a light transmission rate lower than that of blocks 413b, and may have, for example, light blocking properties. As used herein, the expression "to have light blocking properties" means having a light transmission rate relatively lower than that of a portion that has light transmission properties, and may also mean, for example, having a light transmission rate of less than 10%, or to completely block light (i.e., having a light transmission rate of substantially zero). Main body 413a may be transparent. Main body 413a is produce by, for example, molding a silicone rubber. However, the method is not limited thereto.

Blocks 413b are fitted into the through holes formed in main body 413a. Blocks 413b may be, for example, detachable fitted to main body 413a. Blocks 413b constitute portions (first portions) where regions of cushion layer 413 in which design elements are provided are superimposed when viewed in a plan view. Blocks 413b are, for example, portions on which first regions 10a are superimposed when viewed in a plan view.

Blocks 413b may have a light transmission rate higher than that of main body 413a. Also, blocks 413b may be, for example, transparent or colored with a light transmission color. For example, blocks 413b may be transparent or may be colored with a light transmission color.

Blocks 413b are produced by, for example, molding a silicone rubber. However, the method is not limited thereto. Also, the shape of blocks 413b when viewed in a plan view is not limited to a rectangular shape.

Here, main body 413a and blocks 413b have the same cross-sectional shape. That is, in each of main body 413a and blocks 413b, first concave portions 13a and second concave portions 13b are formed. First concave portions 13a and second concave portions 13b that are formed in main body 413a, and first concave portions 13a and second concave portions 13b that are formed in blocks 413b have, for example, the same size, shape, and density. With this configuration, cushion layer 413 can provide the same tactile sensation to the user no matter which one of portions of outer cover 11 that correspond to main body 413a and blocks 413b is pressed by the user.

Main body 413a does not necessarily need to have through holes, and may have, for example, bottomed tubular recesses. For example, the movement of blocks 413b in the minus direction of the Z axis may be restricted as a result of bottom surfaces of blocks 413b (the surfaces of blocks 413b on the minus side of the Z axis) abutting against upper surfaces of bottoms that form the recesses (the surfaces of the recesses on the plus side of the Z axis). With this configuration, it is possible to suppress a situation in which blocks 413b move in the Z axis direction by vibrations of the vehicle or the like. In this case, at least the bottom of main body 413a has light transmission properties.

(Variation 5 of the Embodiment)

Figure 14:
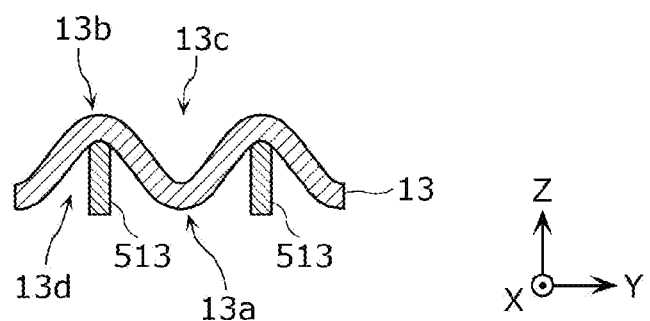
FIG. 14 is a cross-sectional view of a light blocking sheet provided in each space of a cushion layer according to Variation 5 of the embodiment.

In the embodiment given above, an example was described in which no structural member is provided in each of spaces 13d of cushion layer 13. However, the configuration is not limited thereto. A structural member may be provided in each of at least some of the plurality of spaces 13d. A configuration of a cushion layer in which a structural member (for example, a light blocking sheet) is provided in each of at least some of the plurality of spaces 13d will be described with reference to FIG. 14. FIG. 14 is a cross-sectional view for showing light blocking sheets 513 provided in spaces 13d of cushion layer 13 according to the present variation.

As shown in FIG. 14, input device 1 further includes light blocking sheets 513 in spaces 13d of cushion layer 13.

Light blocking sheet 513 is a thin sheet-shaped member that is provided between adjacent first concave portions 13a to suppress a situation in which the light that has passed through one of the adjacent first concave portions 13a enters the other first concave portion 13a (to suppress light leakage). Light blocking sheet 513 is, for example, inserted in space 13d. The light transmission rate of light blocking sheet 513 is lower than that of cushion layer 13. Light blocking sheet 513 has light blocking properties, and may be colored in, for example, black. Also, the shape of light blocking sheet 513 when viewed in a cross section is a rectangular shape, but is not limited thereto.

Light blocking sheet 513 is configured such that the same tactile sensation can be given to the user between when the position of outer cover 11 that corresponds to a portion in which light blocking sheet 513 is provided is pressed and when the position of outer cover 11 that corresponds to a portion in which light blocking sheet 513 is not provided is pressed. Also, for example, light blocking sheet 513 may be thinner than the thickness of cushion layer 13. Also, for example, light blocking sheet 513 may be produced by molding a silicone rubber.

(Variation 6 of the Embodiment)

In the embodiment given above, an example was described in which cushion layer 13 does not contain light diffusing particles that have a light diffusing function. However, the configuration is not limited thereto. Cushion layer 13 may contain light diffusing particles. A configuration of a cushion layer that contains light diffusing particles will be described with reference to FIG. 15. FIG. is a cross-sectional view of cushion layer 613 according to the present variation.

Figure 15:
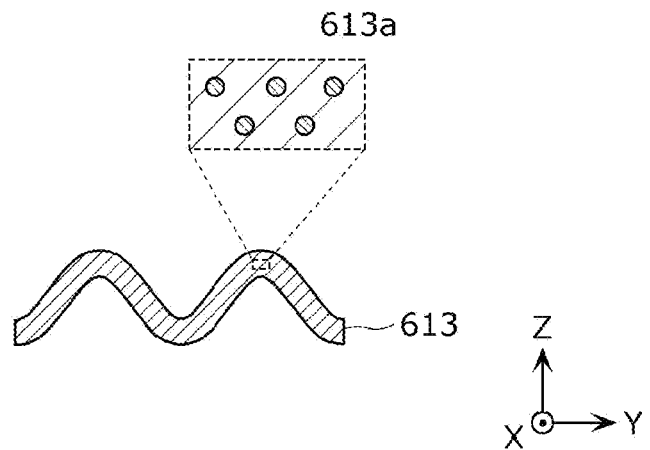
FIG. 15 is a cross-sectional view of a cushion layer according to Variation 6 of the embodiment.

As shown in FIG. 15, outer cover member 10 includes cushion layer 613 instead of cushion layer 13 according to the embodiment.

Cushion layer 613 contains light diffusing particles 613a. Light diffusing particles 613a have a refractive index different from that of the material that constitutes cushion layer 613. In the present embodiment, light diffusing particles 613a have a refractive index different from that of the silicone rubber. Light diffusing particles 613a are inorganic fine particles such as silica or glass beads, but may be resin particles.

Light diffusing particles 613a are contained in first concave portions 13a and second concave portions 13b. Light diffusing particles 613a are uniformly dispersed within cushion layer 613. However, the configuration is not limited thereto. Also, cushion layer 613 that contains light diffusing particles 613a may be produced by using any known production method.

Light diffusing particles 613a do not necessarily need to be contained in cushion layer 613, and may be contained in design sheet 12 (for example, sheet member 12a). In the case where sheet member 12a is formed by using a silicone rubber that has light transmission properties, light diffusing particles 613a have a refractive index different from that of the silicone rubber.

As described above, as a result of at least one of design sheet 12 or cushion layer 613 containing light diffusing particles 613a, the input device according to the present variation can suppress the occurrence of brightness variations even when cushion layer 613 is configured by arranging a plurality of first concave portions 13a and a plurality of second concave portions 13b.

(Variation 7 of the Embodiment)

Figure 16:
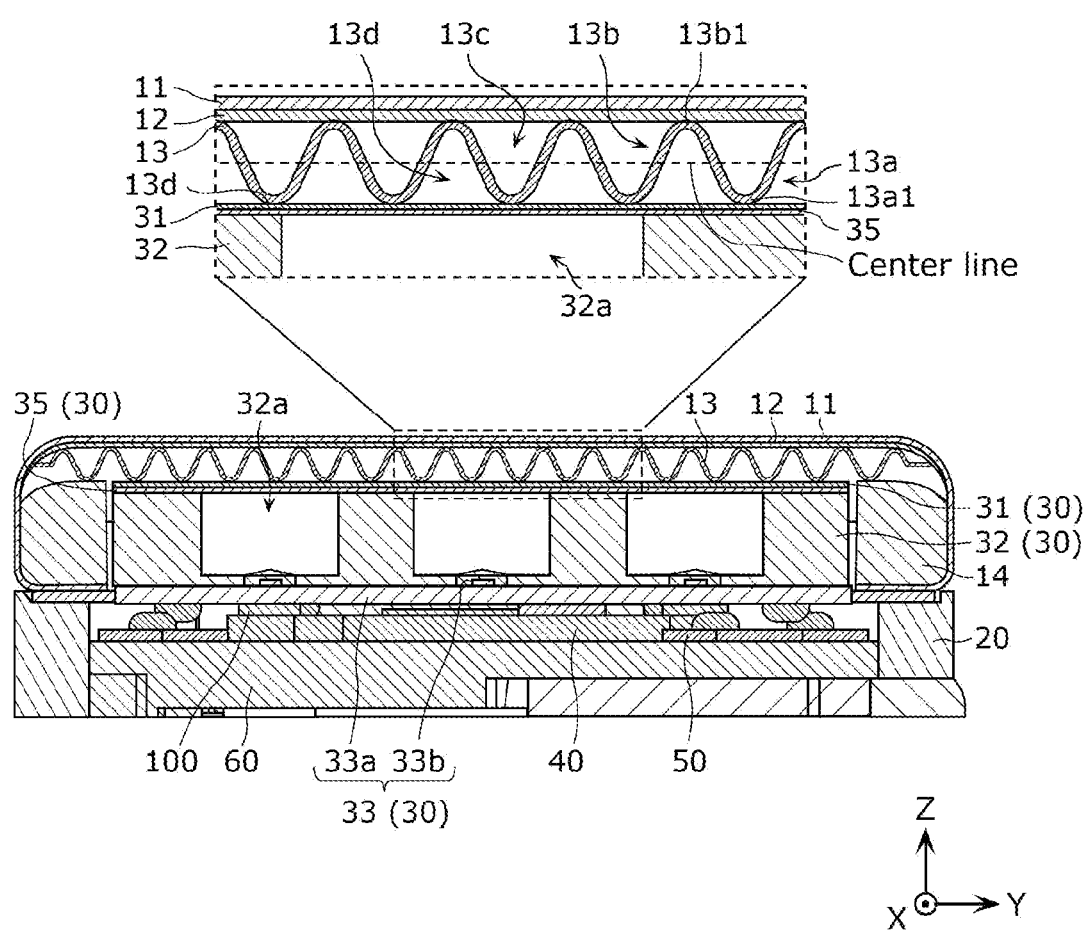
FIG. 16 is a cross-sectional view of an input device according to Variation 7 of the embodiment.

In the embodiment given above, an example was described in which, in portions corresponding to through holes 32a of frame 32, cushion layer 13 is held only by sensor film 31 as shown in FIG. 5. However, the configuration is not limited thereto. Sensor film 31 and protective layer 35 that has light transmission properties may be provided in this order on a surface of cushion layer 13 that is opposite to a surface of cushion layer 13 on which outer cover 11 is provided. A configuration of an input device that includes protective layer 35 will be described with reference to FIG. 16. FIG. 16 is a cross-sectional view of an input device according to the present variation.

As shown in FIG. 16, in the input device according to the present variation, between cushion layer 13 and frame 32, sensor film 31 and protective layer 35 are provided in this order from the cushion layer 13 side.

Frame 32 is provided between sensor film 31 and light source 33 and includes through holes 32a at positions corresponding to the design elements formed in design sheet 12.

Protective layer 35 reduces the stress applied to sensor film 31 provided in portions corresponding to through holes 32a by a pressing force when the user performs a press operation. For example, in the configuration shown in FIG. 5, cushion layer 13 is held only by sensor film 31 in the portions corresponding to through holes 32a of frame 32. For this reason, each time the upper portion (outer cover 11) of through hole 32a that corresponds to a design element is pressed by a finger, the pressing force is applied directly to sensor film 31 via compression-deformed cushion layer 13. As a result, in sensor film 31, stress may be concentratedly applied to, in particular, the edge portion of through hole 32a.

To address this, with the input device according to the present variation, protective layer 35 is provided between sensor film 31 and frame 32. With this configuration, in particular, the stress applied to the edge portion of through hole 32a is received by protective layer 35, and thus the stress concentratedly applied to sensor film 31 is reduced, and high reliability can be obtained.

In order to reduce the stress concentratedly applied to sensor film 31, protective layer 35 is harder than sensor film 31. Protective layer 35 is, for example, a light transmission resin plate (for example, a polycarbonate plate), PET (polyethylene terephthalate) film, or the like, but is not limited thereto. Protective layer 35 may be formed by using, for example, a silicone rubber that has light transmission properties. Also, protective layer 35 may be formed by using the same material (for example, a PET film) as that of sensor film 31. In this case, protective layer 35 is thicker than sensor film 31.

Protective layer 35 may contain light diffusing particles (for example, light diffusing particles 613a) as described in Variation 7 of the embodiment. The light diffusing particles have a refractive index different from that of the resin or the silicone rubber that constitutes protective layer 35, and may be, for example, inorganic fine particles such as silica or glass beads, or resin particles. With this configuration, the light emitted from light source 33 is diffused in advance before the light reaches cushion layer 13. Accordingly, the input device according to the present variation can suppress brightness variations caused by cushion layer 13, and further improve the appearance of the design elements.

Also, the brightness variations caused by cushion layer 13 can be further suppressed by combining protective layer 35 of the present variation that contains light diffusing particles with the configuration of Variation 6 of the embodiment in which at least one of design sheet 12 or cushion layer 613 contains light diffusing particles 613a.

Also, protective layer 35 is formed to cover the regions of frame 32 in which through holes 32a are formed and the region of frame 32 in which no through hole 32a is formed when viewed in a plan view. It can also be said that protective layer 35 is formed to extend over first regions 10a (see FIG. 1) and second region 10b (see FIG. 1) when viewed in a plan view. It can also be said that protective layer 35 is formed to extend over the switch portions and the non-switch portion when viewed in a plan view.

In the case of the configuration in which a light guiding member is provided for each through hole 32a to close through hole 32a or the configuration in which frame 32 is formed by two-color molding a light transmission resin and a light blocking resin, without forming through holes 32a as described in the embodiment given above, protective layer 35 may not need to be formed because the stress concentratedly applied to sensor film 31 due to a press operation performed by the user rarely occurs.

(Variation 8 of the Embodiment)

In the embodiment given above, an example was described in which vibration device 40 is provided on the minus side of the Z axis of frame member 30. With this configuration, the input device enables the user to easily feel the vibrations in the Z axis direction (the thickness direction of cushion layer 13). However, the configuration is not limited thereto. Vibration device 40 may be configured to also vibrate within the XY axis plane, or in other words, in the plane direction of cushion layer 13. As a specific example of vibration device 40 that also vibrates in the plane direction described above, in FIG. 5, vibration device 40 that vibrates in the Z axis direction may be attached at an angle to frame member 30.

With this configuration, frame member 30 vibrates not only in Z the axis direction, but also in the X axis direction, the Y axis direction, or both directions. Here, when cushion layer 13 is compression-deformed by the press operation performed by the user, at least a portion of the vibrations in the Z axis direction is absorbed by the cushion layer. However, by configuring vibration device 40 to also vibrate in the X axis direction, the Y axis direction, or both directions, the vibrations in a direction other than the Z axis direction, or in other words, the vibrations in the plane direction of cushion layer 13 can be transmitted to the user's finger, and thus the vibrations absorbed by cushion layer 13 can be suppressed.

In the present variation, a configuration was described in which vibration device 40 is attached at an angle to frame member 30. However, the configuration is not limited thereto. In the input device, for example, vibration device 40 that can vibrate in the X axis direction, the Y axis direction, or both directions may be attached to frame member 30 to cause cushion layer 13 to vibrate only in the plane direction, or vibration device 40 that can vibrate in all directions including the X axis direction, the Y axis direction, and the Z axis direction may be attached to frame member 30.

In the case where vibration device 40 vibrates in the plane direction, a gap that corresponding to the amount of vibrations in the plane direction may be provided between frame member 30 (for example, frame 32) and frame body 14.

OTHER EMBODIMENTS

Input device 1 according to one or more aspects of the present disclosure has been described based on the embodiment and the like. However, the present disclosure is not limited to the embodiment and the like given above. The one or more aspects of the present disclosure may also encompass other embodiments obtained by making various modifications that can be conceived by a person having ordinary skill in the art to the above embodiment and the like as well as embodiments implemented by any combination of the structural elements of different embodiments without departing from the scope of the one or more aspects of the present disclosure.

For example, in the embodiment and the like given above, an example was described in which outer cover 11, design sheet 12, and cushion layer 13 are stacked in direct contact with each other in this order, but the configuration is not limited thereto. An additional tabular layer may be provided in at least one of between outer cover 11 and design sheet 12 or between design sheet 12 and cushion layer 13. The tabular layer may be a layer that has cushioning properties.

Also, in the embodiment and the like given above, there is no particular limitation on the number of push detectors 100 included in input device 1. The number of push detectors 100 included in input device 1 may be one, or two or more.

Also, in the embodiment and the like given above, an example was described in which each design element is displayed by the light that has passed through design sheet 12. However, the configuration is not limited thereto. Input device 1 may be configured such that each design element is displayed by the light blocked by design sheet 12.

Also, in the embodiment and the like given above, an example was described in which light source 33 includes a plurality of light emitting elements 33b. However, light source 33 may include, for example, one surface light source.

Also, the height, the thickness, and the like used in the embodiment and the like given above may be any of an average length value, a median length value, a mode length value, a maximum length value, and a minimum length value.

Also, the functional blocks shown in the block diagram are merely exemplary. Accordingly, it is possible to implement a plurality of functional blocks as a single functional block, or divide a single functional block into a plurality of blocks. Alternatively, some functions may be transferred to other functional blocks. Also, the functions of a plurality of functional blocks that have similar functions may be processed by a single piece of hardware or software in parallel or by time division.

Also, in the embodiment given above, a structural element (for example, a controller) may be configured using dedicated hardware, or may be implemented by executing a software program suitable for the structural element. The structural element may be implemented by a program executor such as a CPU or a processor reading and executing a software program recorded in a recording medium such as a hard disk or a semiconductor memory.

FURTHER INFORMATION ABOUT TECHNICAL BACKGROUND TO THIS APPLICATION

The disclosures of the following patent applications including specification, drawings, and claims are incorporated herein by reference in their entirety: Japanese Patent Application No. 2022-074482 filed on Apr. 28, 2022, and Japanese Patent Application No. 2022-170883 filed on Oct. 25, 2022.

INDUSTRIAL APPLICABILITY

The present disclosure is useful as a display device and an input device incorporated in a vehicle or the like.

While various embodiments have been described herein above, it is to be appreciated that various changes in form and detail may be made without departing from the spirit and scope of the present disclosure as presently or hereafter claimed.

The invention claimed is:

1. A display device comprising:
   an outer cover that has light transmission properties;
   a design portion that has light transmission properties and is provided on a front surface side or a back surface side relative to the outer cover;

a cushion layer that has light transmission properties and is provided on the back surface side relative to the outer cover; and a light source provided on a back surface side relative to the cushion layer, wherein, when the display device is viewed in a cross section taken along a plane parallel to a stack direction in which the outer cover and the design portion are stacked, the cushion layer includes a plurality of concave portions that are in a convex shape in the stack direction and a concave shape on a side opposite to the convex shape, the plurality of concave portions include first concave portions and second concave portions, the first concave portions are in a convex shape in a first orientation in the stack direction relative to a reference line that is parallel to a first direction that intersects the stack direction and a concave shape on a side opposite to the convex shape in the first orientation, the second concave portions are connected to the first concave portions and are in a convex shape in a second orientation that is opposite to the first orientation in the stack direction relative to the reference line and a concave shape on a side opposite to the convex shape in the second orientation, and the first concave portions and the second concave portions are alternately provided in the first direction.

2. The display device according to claim 1, wherein the first concave portions and the second concave portions that are alternately provided form a corrugated shape when the display device is viewed in the cross section taken along the plane parallel to the stack direction.

3. The display device according to claim 1, wherein the cushion layer includes a first corrugated member in which the plurality of first concave portions and the plurality of second concave portions that are alternately provided in the first direction extend in a second direction that intersects the first direction when the display device is viewed in a plan view.

4. The display device according to claim 3, wherein the cushion layer further includes a second corrugated member that is provided to overlap the first corrugated member and in which first concave portions and second concave portions that are configured in an identical manner as the first concave portions and the second concave portions of the first corrugated member are alternately provided in the second direction, and the plurality of first concave portions and the plurality of second concave portions that are alternately provided in the second direction extend in a third direction that intersects the second direction when the display device is viewed in the plan view.

5. The display device according to claim 4, wherein the first direction and the second direction are orthogonal to each other when the display device is viewed in the plan view, the second direction and the third direction are orthogonal to each other when the display device is viewed in the plan view, and the first direction and the third direction are identical directions.

6. The display device according to claim 4, wherein, where a pitch between adjacent ones of the plurality of first concave portions or adjacent ones of the plurality of second concave portions of the first corrugated member is represented by p1, a length in the stack direction between a ridge of each of the plurality of first concave portions and a ridge of each of the plurality of second concave portions of the first corrugated member is less than p1, and where a pitch between adjacent ones of the plurality of first concave portions or adjacent ones of the plurality of second concave portions of the second corrugated member is represented by p2, a length in the stack direction between a ridge of each of the plurality of first concave portions and a ridge of each of the plurality of second concave portions of the second corrugated member is less than p2.

7. The display device according to claim 1, wherein the cushion layer includes the plurality of first concave portions and the plurality of second concave portions that are two-dimensionally arranged when the display device is viewed in a plan view.

8. The display device according to claim 7, wherein, when the display device is viewed in the cross section taken along the plane parallel to the stack direction, the cushion layer further includes the first concave portions and the second concave portions that are alternately provided in a second direction that intersects the first direction when the display device is viewed in the plan view, in addition to the first concave portions and the second concave portions that are alternately provided in the first direction, the first concave portions and the second concave portions that are alternately provided in the second direction are positioned differently in the stack direction relative to the reference line from the first concave portions and the second concave portions that are alternately provided in the first direction, and the first concave portions provided in the first direction and the second concave portions provided in the second direction are connected to each other.

9. The display device according to claim 1, wherein the second orientation is an orientation extending from the cushion layer toward the outer cover, and the plurality of second concave portions each have a ridge with a flat surface.

10. The display device according to claim 1, wherein, when the display device is viewed in a plan view, the cushion layer includes a first portion on which a design element formed in the design portion is superimposed and a second portion surrounding the first portion, and the first portion has a light transmission rate higher than a light transmission rate of the second portion.

11. The display device according to claim 10, wherein the first portion is transparent or colored with a light transmission color, and the second portion has light blocking properties.

12. The display device according to claim 1, wherein a sheet that has light blocking properties is provided between each adjacent pair of the plurality of first concave portions.

13. The display device according to claim 1, wherein the design portion is provided to be superimposed on two or more of the plurality of first concave portions and two or more of the plurality of second concave portions when the display device is viewed from the stack direction.

14. The display device according to claim 1, wherein the cushion layer is formed by using a silicone rubber that has light transmission properties.

15. The display device according to claim 14,
wherein the cushion layer contains light diffusing particles that have a refractive index different from a refractive index of the silicone rubber.

16. The display device according to claim 1,
wherein the design portion contains a silicone rubber that has light transmission properties and light diffusing particles that have a refractive index different from a refractive index of the silicone rubber.

17. The display device according to claim 1,
wherein the design portion includes a print layer on which design elements are provided.

18. The display device according to claim 1,
wherein the design portion includes a design sheet in which design elements are provided.

19. The display device according to claim 1,
wherein the plurality of first concave portions or the plurality of second concave portions are quadrilateral, hexagonal, or circular in shape when the display device is viewed in a plan view.

20. An input device comprising:
the display device according to claim 1; and
a detector that is provided on the back surface side relative to the cushion layer and detects an operation from a user.

21. The input device according to claim 20,
wherein the cushion layer is compression-deformed in response to the outer cover being pressed.

22. The input device according to claim 20,
wherein the detector detects the operation from the user when the outer cover is further pressed while the cushion layer is compression-deformed.

23. The input device according to claim 20,
wherein the detector includes, on a surface of the cushion layer opposite to a surface of the cushion layer on which the outer cover is provided, a sensor film that has light transmission properties and detects an operation position, and
the input device further comprises:
a tabular frame that is provided between the sensor film and the light source and includes through holes at positions corresponding to design elements formed in the design portion; and
a protective layer that has light transmission properties and is provided between the sensor film and the tabular frame.

24. The input device according to claim 23,
wherein the protective layer contains light diffusing particles.

25. The input device according to claim 20, further comprising:
a vibration device that transmits vibrations to the cushion layer,
wherein the vibration device vibrates in at least a plane direction of the cushion layer.

* * * * *